US012602125B2

(12) United States Patent
Summa et al.

(10) Patent No.: US 12,602,125 B2
(45) Date of Patent: Apr. 14, 2026

(54) ADJUSTABLE INPUT MODES FOR A HANDHELD CONTROLLER

(71) Applicant: Dell Products L.P., Round Rock, TX (US)

(72) Inventors: Erik Summa, Austin, TX (US); Tyler Ryan Cox, Austin, TX (US); Jason Scott Morrison, Chadron, NE (US); Uboho Victor, San Antonio, TX (US); Jaegeon Park, Opelika, AL (US)

(73) Assignee: Dell Products L.P., Round Rock, TX (US)

( * ) Notice: Subject to any disclaimer, the term of this patent is extended or adjusted under 35 U.S.C. 154(b) by 354 days.

(21) Appl. No.: 18/063,921

(22) Filed: Dec. 9, 2022

(65) Prior Publication Data

US 2024/0192794 A1 Jun. 13, 2024

(51) Int. Cl.
| | |
|---|---|
| *G06F 3/041* | (2006.01) |
| *A63F 13/214* | (2014.01) |
| *A63F 13/28* | (2014.01) |
| *A63F 13/40* | (2014.01) |
| *G06F 3/01* | (2006.01) |
| *G06T 11/00* | (2006.01) |

(52) U.S. Cl.
CPC .......... *G06F 3/0416* (2013.01); *A63F 13/214* (2014.09); *A63F 13/28* (2014.09); *A63F 13/40* (2014.09); *G06F 3/016* (2013.01); *G06T 11/00* (2013.01)

(58) Field of Classification Search
CPC .... G06F 3/0416; G06F 3/016; G06F 3/03547; G06F 3/038; A63F 13/214; A63F 13/28; A63F 13/40; G06T 11/00
See application file for complete search history.

(56) References Cited

U.S. PATENT DOCUMENTS

| | | | | |
|---|---|---|---|---|
| 10,328,344 | B2 * | 6/2019 | Bellinghausen | ...... A63F 13/285 |
| 10,866,721 | B1 * | 12/2020 | Demers | ................... A63F 13/20 |
| 11,240,365 | B1 * | 2/2022 | Hulbert | ............ H04M 1/72448 |
| 11,504,610 | B2 * | 11/2022 | VanWyk | ................. A63F 13/24 |
| 11,638,868 | B2 * | 5/2023 | Spofford | ............. G06F 3/04883 |
| | | | | 345/173 |
| 11,853,491 | B1 * | 12/2023 | Huang | .................... G06F 3/044 |
| 11,863,905 | B1 * | 1/2024 | Oostergo | .............. H04N 7/147 |

(Continued)

OTHER PUBLICATIONS

Steam(service). Wikipedia.org. Online. Nov. 20, 2021. Accessed via the Internet. Accessed Jan. 23, 2025. <URL: https://en.wikipedia.org/w/index.php?title=Steam_(service)&oldid=1056298925> (Year: 2021).*

(Continued)

*Primary Examiner* — Carl V Larsen

(74) *Attorney, Agent, or Firm* — Norton Rose Fulbright US LLP

(57) ABSTRACT

An information handling system may perform various methods and operations. An example method performed by an information handling system may include determining, by the information handling system, a first input mode for a touchpad of a handheld controller, determining, by the information handling system, a graphical overlay corresponding to the first input mode, wherein the graphical overlay includes a graphical representation of the touchpad, and displaying, by the information handling system, the graphical overlay.

19 Claims, 14 Drawing Sheets

(56)  References Cited

U.S. PATENT DOCUMENTS

| | | | | |
|---|---|---|---|---|
| 2002/0021289 | A1* | 2/2002 | Combs | G06F 3/04886 |
| | | | | 345/173 |
| 2003/0046401 | A1* | 3/2003 | Abbott | G06F 9/451 |
| | | | | 709/227 |
| 2006/0111180 | A1* | 5/2006 | Cheng | A63F 13/2145 |
| | | | | 463/36 |
| 2010/0306702 | A1* | 12/2010 | Warner | G06F 3/0482 |
| | | | | 715/834 |
| 2010/0328206 | A1* | 12/2010 | Morin | G06F 3/03547 |
| | | | | 345/157 |
| 2011/0169749 | A1* | 7/2011 | Ganey | G06F 3/04886 |
| | | | | 345/173 |
| 2012/0032877 | A1* | 2/2012 | Watkins, Jr. | G06F 1/1677 |
| | | | | 345/156 |
| 2012/0036434 | A1* | 2/2012 | Oberstein | G06F 3/0488 |
| | | | | 715/702 |
| 2013/0012319 | A1* | 1/2013 | Negroponte | A63F 13/92 |
| | | | | 463/37 |
| 2013/0019205 | A1* | 1/2013 | Gil | G06F 3/0488 |
| | | | | 715/810 |
| 2013/0093688 | A1* | 4/2013 | Papakipos | G06F 3/0485 |
| | | | | 345/173 |
| 2013/0104079 | A1* | 4/2013 | Yasui | G06F 3/0482 |
| | | | | 715/834 |
| 2013/0321287 | A1* | 12/2013 | Adamson | G06F 1/3271 |
| | | | | 345/173 |
| 2014/0071063 | A1* | 3/2014 | Kuscher | G06F 3/04883 |
| | | | | 345/173 |
| 2014/0075388 | A1* | 3/2014 | Kuscher | G06F 3/04883 |
| | | | | 715/834 |
| 2014/0195979 | A1* | 7/2014 | Branton | G06F 3/0488 |
| | | | | 715/810 |
| 2015/0105152 | A1* | 4/2015 | Bellinghausen | A63F 13/2145 |
| | | | | 463/31 |
| 2017/0192627 | A1* | 7/2017 | Agnoli | G06F 3/04847 |
| 2017/0364190 | A1* | 12/2017 | Rihn | G06F 3/016 |
| 2018/0039331 | A1* | 2/2018 | Warren | G06F 3/043 |
| 2020/0376376 | A1* | 12/2020 | Demers | G06F 3/04845 |
| 2021/0252387 | A1* | 8/2021 | Spofford | A63F 13/533 |
| 2021/0333864 | A1* | 10/2021 | Harvey | G06T 19/006 |
| 2022/0103675 | A1* | 3/2022 | Hulbert | G06Q 20/204 |
| 2022/0300106 | A1* | 9/2022 | Cheng | G06F 3/03545 |
| 2023/0164515 | A1* | 5/2023 | Jung | H04W 4/025 |
| | | | | 455/456.3 |
| 2023/0409179 | A1* | 12/2023 | Liang | G06F 3/04847 |
| 2023/0419635 | A1* | 12/2023 | Beauchamp | G06V 10/25 |

OTHER PUBLICATIONS

Gormash. The Steam Controller 101 guide. steamcommunity.com. Online. Feb. 21, 2015. Accessed via the Internet. Accessed Jan. 23, 2025. <URL: https://steamcommunity.com/sharedfiles/filedetails/?id=563774882> (Year: 2015).*

Radial Menus. Partner.steamgames.com. Online. Nov. 14, 2021. Accessed via the Internet. Accessed Jan. 23, 2025. <URL: https://web.archive.org/web/20211114013749/https://partner.steamgames.com/doc/features/steam_controller/radial_menus> (Year: 2021).*

* cited by examiner

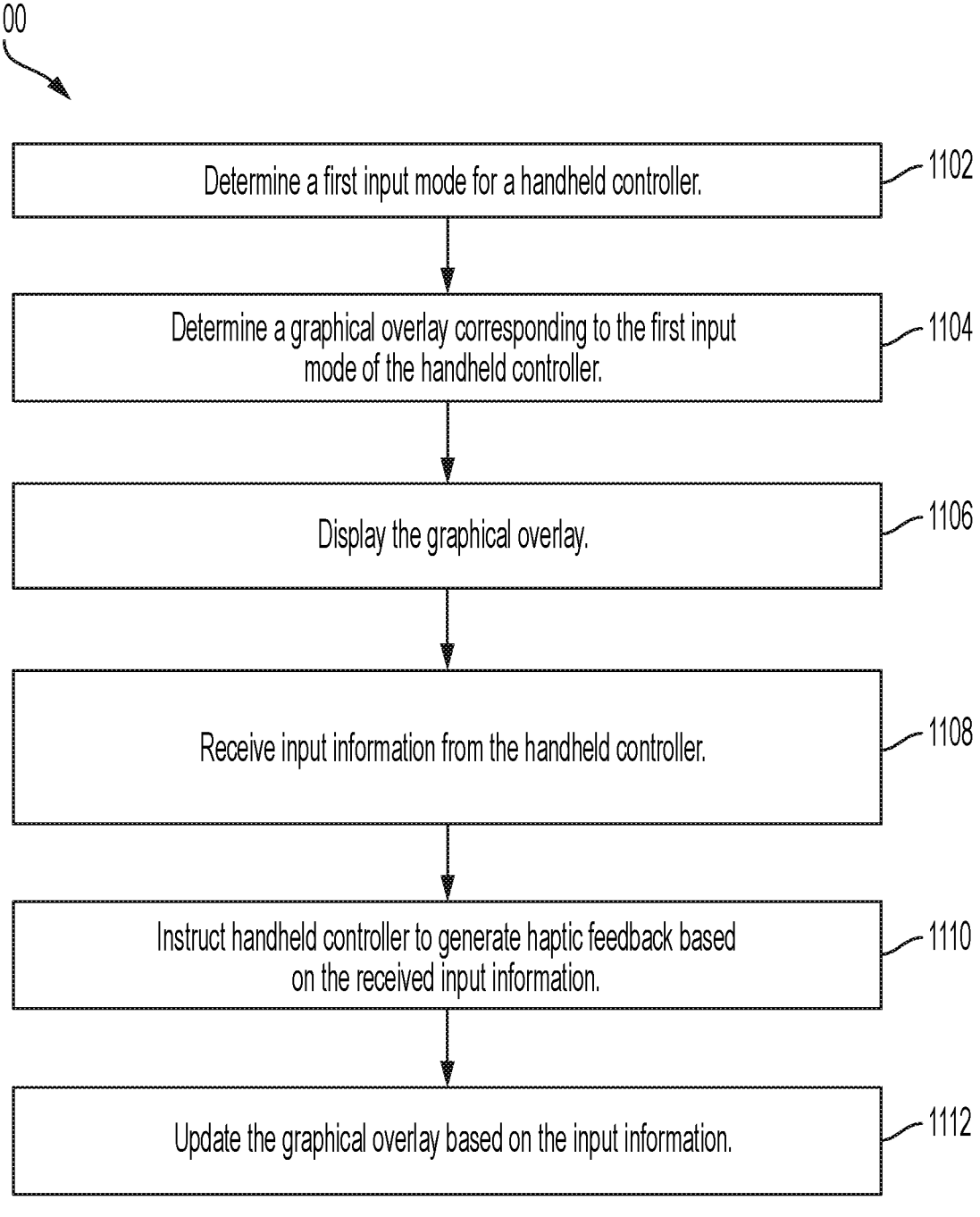

1100

Determine a first input mode for a handheld controller. — 1102

Determine a graphical overlay corresponding to the first input mode of the handheld controller. — 1104

Display the graphical overlay. — 1106

Receive input information from the handheld controller. — 1108

Instruct handheld controller to generate haptic feedback based on the received input information. — 1110

Update the graphical overlay based on the input information. — 1112

FIG. 11

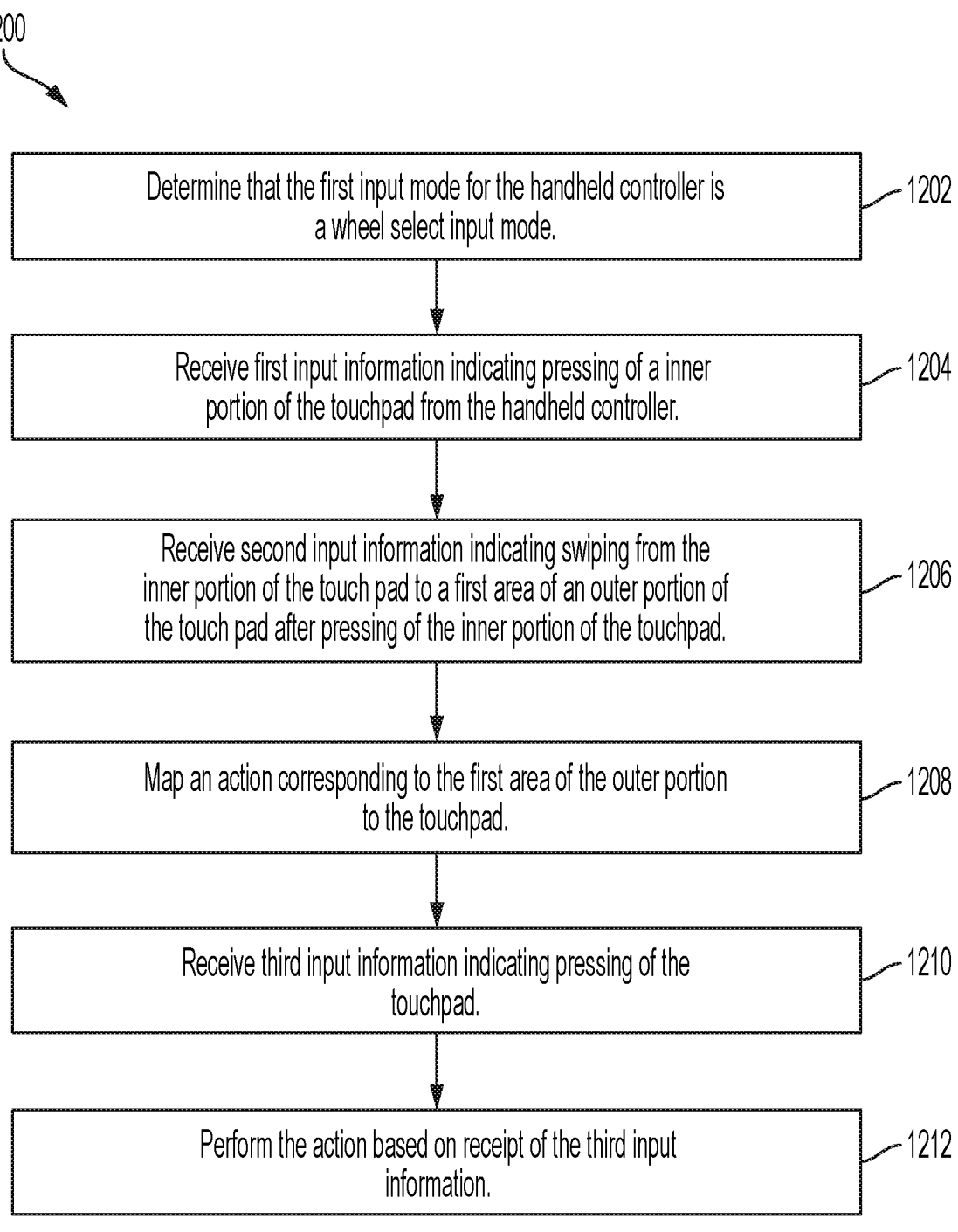

1200

| Determine that the first input mode for the handheld controller is a wheel select input mode. | 1202 |

| Receive first input information indicating pressing of a inner portion of the touchpad from the handheld controller. | 1204 |

| Receive second input information indicating swiping from the inner portion of the touch pad to a first area of an outer portion of the touch pad after pressing of the inner portion of the touchpad. | 1206 |

| Map an action corresponding to the first area of the outer portion to the touchpad. | 1208 |

| Receive third input information indicating pressing of the touchpad. | 1210 |

| Perform the action based on receipt of the third input information. | 1212 |

FIG. 12

ADJUSTABLE INPUT MODES FOR A HANDHELD CONTROLLER

FIELD OF THE DISCLOSURE

The instant disclosure relates to information handling systems. More specifically, portions of this disclosure relate to adjustable input modes for handheld controllers for information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A variety of input devices are available for use in providing user input to information handling systems. For example, one popular combination of input devices is the keyboard and mouse. A mouse may provide cursor and motion input to an information handling system, while a keyboard may provide up to one hundred or more specific inputs mapped to specific keys of the keyboard. Another popular input device is the handheld controller. Handheld controllers may provide fewer keys or buttons for input than a keyboard but may be more ergonomic to hold and use in certain situations, such as when using an information handling system away from a desk. Furthermore, handheld controllers may allow for types of inputs that are not present in a mouse and keyboard combination, such as control stick inputs. However, handheld controllers may not provide the wide array of selectable inputs provided by a mouse and keyboard combination.

Shortcomings mentioned here are only representative and are included simply to highlight that a need exists for improved information handling systems. Embodiments described herein address certain shortcomings but not necessarily each and every one described here or known in the art. Furthermore, embodiments described herein may present other benefits than, and be used in other applications than, those of the shortcomings described above.

SUMMARY

Information handling systems may be used to execute applications such as gaming and productivity applications. A variety of input devices may be used to control information handling systems. One example input device that may be used to provide input to an information handling system is a handheld controller. A handheld controller may be configurable for use of multiple input modes depending on an environment for which input is being received from the handheld controller. For example, a handheld controller may include a touchpad having multiple input modes, such as a touchpad input mode, a swipe input mode, a wheel select input mode, and a direct input mode. The input modes may be further configurable for mapping of specific actions to specific inputs of the input modes.

An information handling system receiving input from the handheld controller may determine an input mode for the controller based on an environment for which input is being received and a user profile of a user using the handheld controller and may receive input from the controller. Such input flexibility may enhance a user experience by allowing a user to select from among a greater number of inputs while enjoying the benefits of a handheld controller. Input flexibility may be further enhanced by allowing different input modes to be assigned to different portions of a touchpad. Thus, a determined input mode for a handheld controller may include multiple input modes for multiple portions of a touchpad of the handheld controller. For example, a swipe input mode may be assigned to a top half of the touchpad while a wheel select input mode may be assigned to a bottom half of the touchpad. Such combinations may provide additional input options for a user, further enhancing a user experience.

Additionally, an information handling system may display a graphical overlay corresponding to a determined input mode for a connected handheld controller. For example, if a user is currently using a handheld controller to provide input for a gaming application executed by the information handling system, the information handling system may overlay a graphical overlay on a display or section of a display displaying the gaming application. The graphical overlay may indicate one or more inputs available to the user corresponding to the determined input mode for the handheld controller, such as one or more in game actions that correspond to one or more inputs via a touchpad of the handheld controller according to the determined input mode. Display of a graphical overlay corresponding to a determined input mode for a handheld controller may enhance a user experience by assisting a user with determining a current input mode of the handheld controller and determining one or more actions that correspond to one or more inputs to allow the user to input a desired input. Furthermore, the graphical overlay may be updated to reflect input received from a user according to the input mode, such as to indicate an action assigned to a portion of the touchpad that a user is currently touching. Haptic feedback may also be provided to the user, such as vibration of the touchpad, based on the received input information. Such visual and tactile feedback may further enhance a user experience, providing the user with feedback to enable the user to more easily select specific actions to be performed.

An information handling system may display a graphical overlay based on a determined input mode for a handheld controller from which input is being received. A method for such display may include determining, by the information handling system, a first input mode for a touchpad of a handheld controller. For example, an information handling system may determine that a first input mode for the touchpad of the first controller includes a touchpad input mode for a touchpad of the handheld controller, a swipe input mode for the touchpad of the handheld controller, a wheel select input mode for the touchpad of the handheld controller, or a direct input mode for the touchpad of the handheld controller. Determining the first input mode for the touchpad of the handheld controller may, for example, include determining a first input mode currently activated for the handheld controller.

Determining the first input mode for the touchpad of the handheld controller may include determining a user profile for a user of the handheld controller, determining an environment for which input is currently being received from the handheld controller, and determining the first input mode of the handheld controller based, at least in part, on the user profile and the environment. For example, determining a user profile for a user of the handheld controller may include identifying a user of the handheld controller, such as through receiving input indicating login credentials of the user, such as a username and password or biometric data of the user. The information handling system may compare the login credentials against a locally stored set of user profiles or may query a server, such as a server of a cloud-based service, for a user profile corresponding to the login credentials. A user profile for the user may indicate input modes that are mapped to particular environments for which input is being received. For example, the user profile may indicate that a first input mode, such as a swipe input mode with a first mapping of actions to particular swipe directions or areas, should be assigned to the controller when input is being received from the handheld controller for a first application and that a second input mode, such as a swipe input mode with a second mapping of actions to particular swipe directions or areas, should be assigned to the handheld controller when input is being received for a second application. Determining the environment for which input is currently being received from the handheld controller may include determining an application for which input is being received from the handheld controller. The information handling system may compare the environment for which input is currently being received from the handheld controller with the user profile, such as with user profile information indicating which input modes are assigned to the controller for specific environments, and may determine, based on the environment and the user profile, the input mode for the handheld controller.

In some embodiments, determining the first input mode for the touchpad of the handheld controller may include determining a second input mode for a first portion of the touchpad of the handheld controller and determining a third input mode, different from the second input mode, for a second portion of the touchpad of the handheld controller. Different input modes may be assigned to different portions of a touchpad of the handheld controller. For example, the first portion of the touchpad may be a top half of the touchpad, and the second portion of the touchpad may be a bottom half of the touchpad. In some embodiments, the touchpad may be circular. The touchpad may be referred to as an omnipad. An overall input mode of the handheld controller may thus include multiple input modes assigned to multiple portions of the touchpad of the handheld controller.

The information handling system may determine a graphical overlay corresponding to the first input mode, wherein the graphical overlay includes a graphical representation of the touchpad. For example, the graphical overlay may be a graphical overlay indicating one or more actions that correspond to one or more inputs of the controller for the first input mode. In some embodiments, the graphical overlay may correspond to both the first input mode and an environment for which input is being received from the handheld controller, such as an application for which input is being received. In particular, the information handling system may store multiple overlays corresponding to multiple environment and input mode pairs and may determine a graphical overlay for display based on the input mode and the usage environment. In some embodiments, such as when the first input mode includes a second input mode for a first portion of a touchpad and a third input mode for a second portion of the touchpad, determining the graphical overlay corresponding to the first input mode may include determining the graphical overlay corresponding to the second input mode and the third input mode. In some embodiments, determining the graphical overlay may include requesting a graphical overlay from a cloud-based service based on the determined input mode.

The information handling system may display the graphical overlay. For example, the information handling system may overlay an application window of an application for which input is being received from the handheld controller with the graphical overlay. The graphical overlay may provide a graphical indication of one or more inputs of the input mode and corresponding actions of the environment, such as actions of the application, that correspond to the one or more inputs. Thus, the graphical overlay may inform the user of the input mode for the handheld controller and input mappings for application actions of the input mode.

In some embodiments, the information handling system may receive input information from the handheld controller and may instruct the handheld controller to generate haptic feedback based on the received input information and the first input mode. For example, the information handling system may instruct the handheld controller to generate specific haptic feedback based on a specific input mode of the handheld controller and specific input received from the handheld controller.

In some embodiments, the information handling system may allow a user to adjust an input mode for the handheld controller. For example, the information handling system may receive input information from the handheld controller indicating a change from the first input mode to a second input mode and may update the graphical overlay based on the change from the first input mode to the second input mode. For example, the graphical overlay corresponding to the first input mode may be a first graphical overlay, and the updated graphical overlay may be a second graphical overlay, displayed based on receipt of input information indicating a change from the first input mode to the second input mode. In some embodiments, the received input information may indicate a change to a user profile, assigning the second input mode to the environment for which input is being received from the handheld controller, such as assigning the second input mode to an application for which input is being received. Thus, a user may adjust an input mode of the controller and the graphical overlay may be updated to reflect the adjustment.

One type of input mode that may be determined for the handheld controller is a wheel select input mode. In a wheel select input mode, a user may press an inner portion of the touchpad of the controller for a period of time, such as 0.5 seconds, or more, to activate an action select function. Pressing the inner portion may, for example, include touching the inner portion or applying pressure to the inner portion. When the action select function is activated, a user may swipe their finger from the inner portion of the touchpad across a surface of the touchpad toward an outer border of the touchpad to select a particular input. For example, an outer portion of the touchpad may be divided into up to twelve, or more, sections, areas, or wedges of the touchpad, and each section may be assigned a particular action of the environment, such as the application, for which input is being received. After the user selects an action by swiping outwards from the inner portion of the touchpad, the action may be saved. For example, the action may be mapped to tapping of the touchpad. Then, the user may tap the touchpad, such as by pressing the touchpad for less than a period of time, such as less than 0.5 seconds, to activate the selected action. Determining the first input mode of the handheld controller may include determining that the first input mode for the touchpad of the handheld controller includes a wheel select input mode for a touchpad of the handheld controller. The information handling system may receive first input information indicating pressing of an inner portion of the touchpad from the handheld controller, such as indicating pressing of the inner portion of the touchpad for a period of time. The information handling system may receive second input information indicating swiping from the inner portion of the touchpad to a first area of an outer portion of the touchpad after pressing of the inner portion of the touchpad. The first area of the outer portion of the touchpad may correspond to an action to be performed by the information handling system, such as an action associated with an environment for which input is being received. The information handling system may then map the action to the touchpad, such as assigning the action to be performed when input information indicating tapping of the touchpad is received from the handheld controller. The information handling system may then receive third input information from the handheld controller indicating pressing of the touchpad and may then perform the action based on receipt of the third input information. Thus, a wheel select mode may allow a user to select an action to be performed when the touchpad is pressed from multiple actions assigned to different areas of an outer portion of the touchpad.

In some embodiments, an information handling system may include a memory and a processor for performing the methods described herein. A computer program product may include a non-transitory computer-readable medium including instructions for causing an information handling system to perform the method described herein.

For example, the methods described herein may be embedded in a computer-readable medium as computer program code comprising instructions that cause a processor to perform operations corresponding to the steps of the method. In some embodiments, the processor may be part of an information handling system including a first network adaptor configured to transmit data over a first network connection; and a processor coupled to the first network adaptor, and the memory.

In some embodiments, the aspects described herein may be used to support the execution of gaming applications in different environments. Gaming sessions may execute on a service, either locally on a device, on another system on the network, or in the cloud. A device may access the gaming session by executing an application that communicates with the service to receive and transmit user input to the service and provide feedback to the user from the service. The device may include its own audio/visual (AV) output for displaying a graphical user interface and/or a rendered display from the gaming session. Different environments at a location may include different AV systems, and the device may be automatically paired with an AV system and may be reconfigured to support interaction with an application session using the paired AV system.

A user's home is one example location that may have multiple environments, such as a living room, a dining room, a study, and/or a bedroom, each with different screen configurations, speaker configurations, and/or network availability. Aspects of embodiments disclosed herein may provide a system that enables game play from a set of candidate game hosts and environments to consumption devices of a user's choice while the user moves about their home between the different environments. The system may employ methods to determine where a user is located within the home, availability and selection of candidate game hosting and target environments, homing and direction of related I/O, and/or AV for consumption. The system then migrates the user and their information to the determined environment by coordinating gameplay by the user. The solution accommodates multiple users simultaneously within the home, whether in single player, multiplayer using the same screen, or multiplayer using separate screen games. The solution may configure AV and input/output (I/O) such that multiple users can consume one or multiple games in the home simultaneously, whether in separate locations or when seated together in front of the same consumption device, e.g., a large television, where multiple games might be hosted simultaneously.

The mobility of a user between services and applications for executing an application session may be supported by an information handling system that uses available telemetry from multiple sources to build a confidence-based knowledge graph of the user's gaming environments and determine a position of the user within that graph. A system with knowledge of devices in a user's gaming environment may build a knowledge graph by aggregating and comparing telemetry. For example, network telemetry may reveal that devices are positioned relatively near each other, a mobile device may reveal an absolute location based on GPS data, and/or an infrared presence sensor may reveal that the user is sitting in front a device. An intelligent system may assemble these individual pieces of telemetry into a broader knowledge graph based on the absolute and/or relative locations of the user's devices, the location of the user in relation, and or characteristics of the devices. This knowledge graph may be updated in real time and/or based on changes in device telemetry.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art. As used herein, "pressing" may refer to touching of a surface or applying pressure to a surface of a device, such as a touchpad.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

8

Figure 9A:
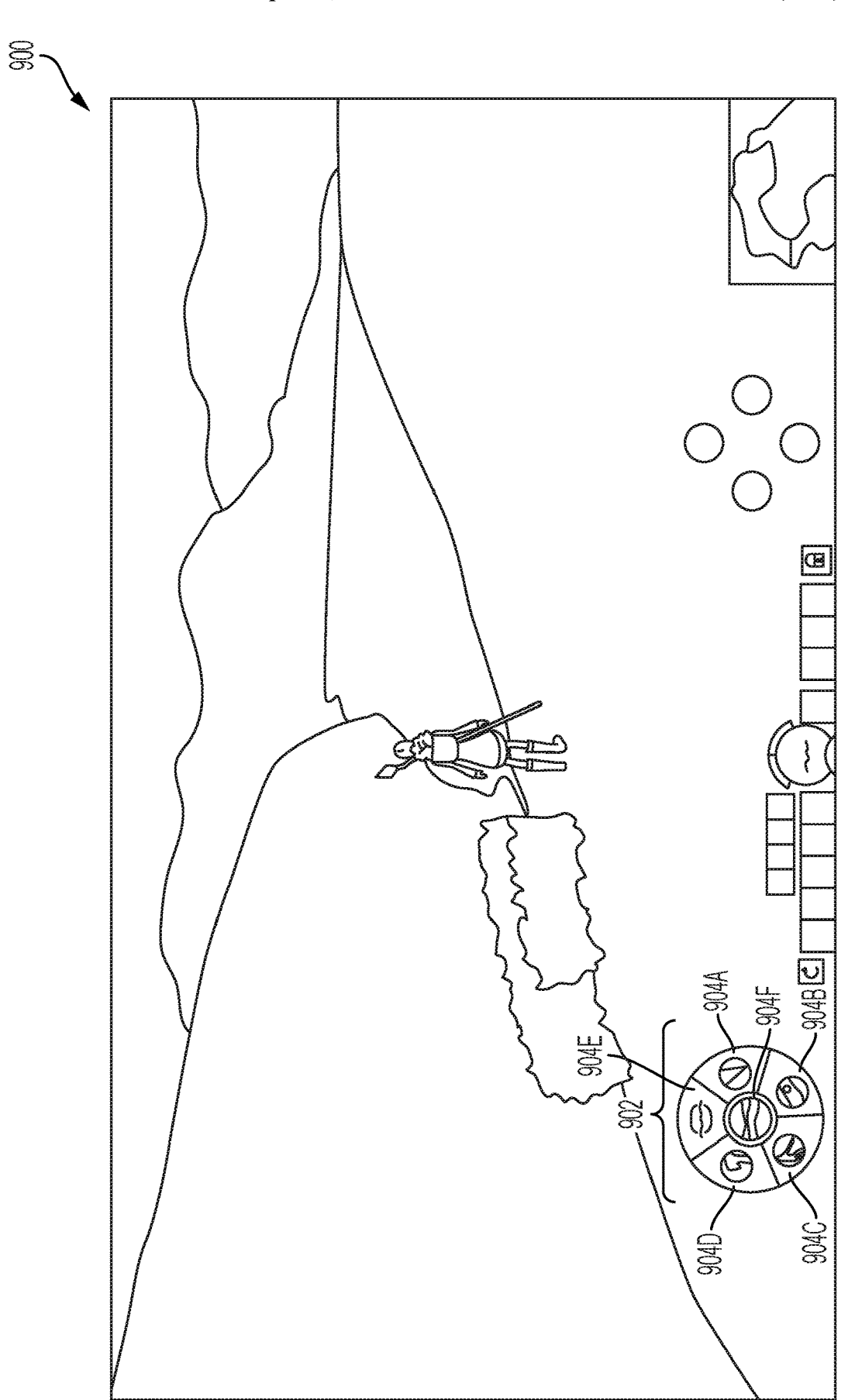

FIG. 9A is an example display including a graphical overlay corresponding to an input mode of a handheld controller according to some embodiments of the disclosure.

Figure 9B:
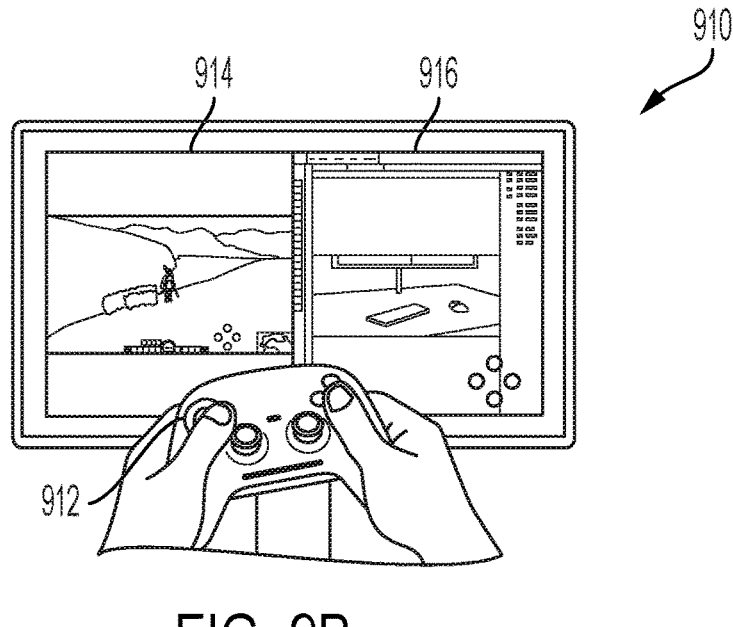

FIG. 9B is an example multi-window display according to some embodiments of the disclosure.

Figure 10A:
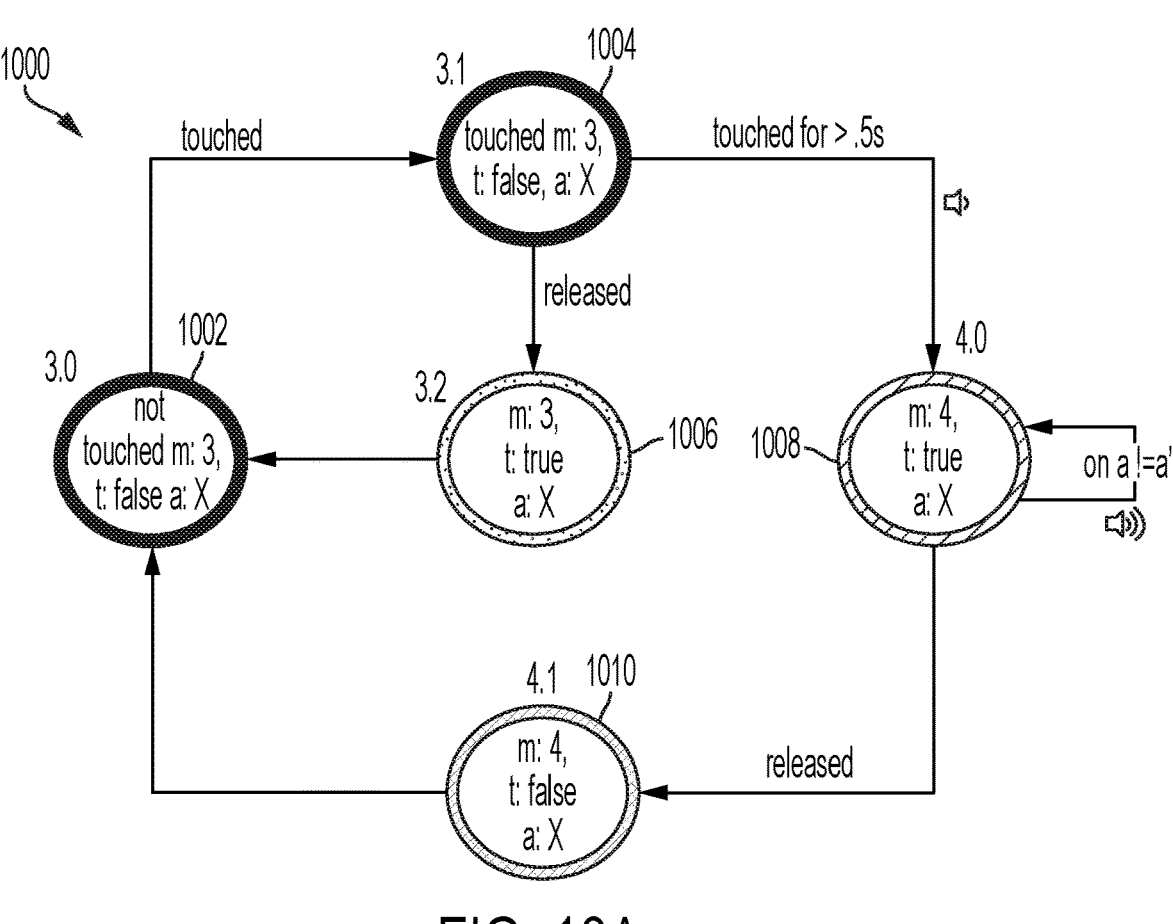

FIG. 10A is an example finite state diagram for a wheel select input mode for a touchpad of a handheld controller according to some embodiments of the disclosure.

Figure 10B:
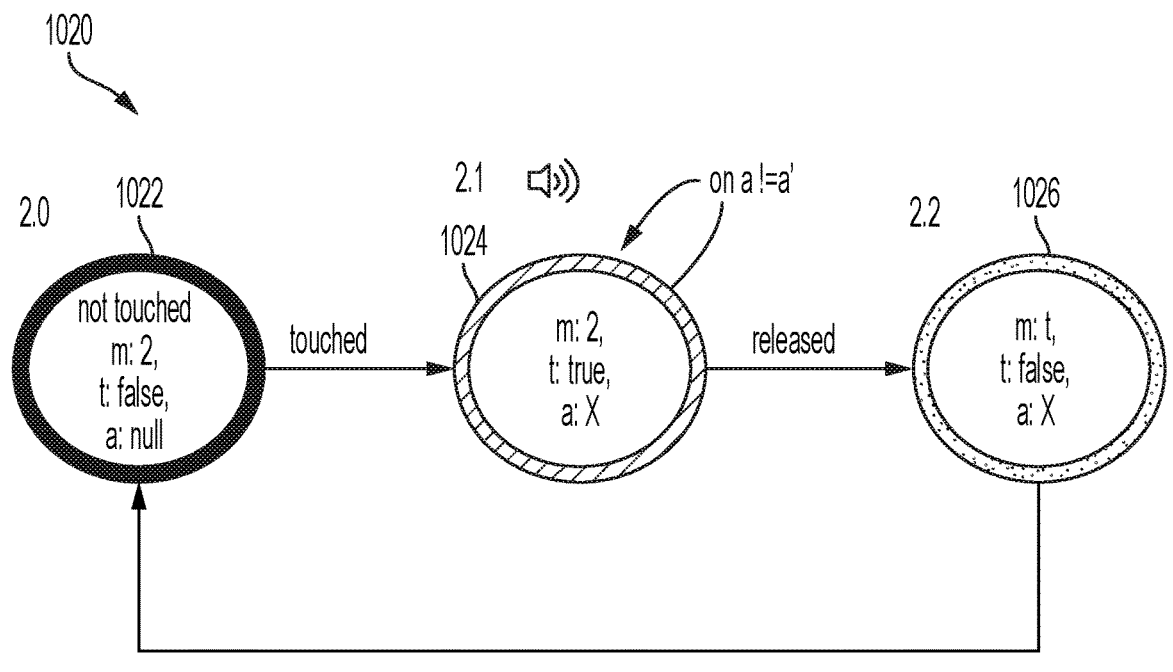

FIG. 10B is an example finite state diagram for a swipe input mode for a touchpad of a handheld controller according to some embodiments of the disclosure.

Figure 10C:
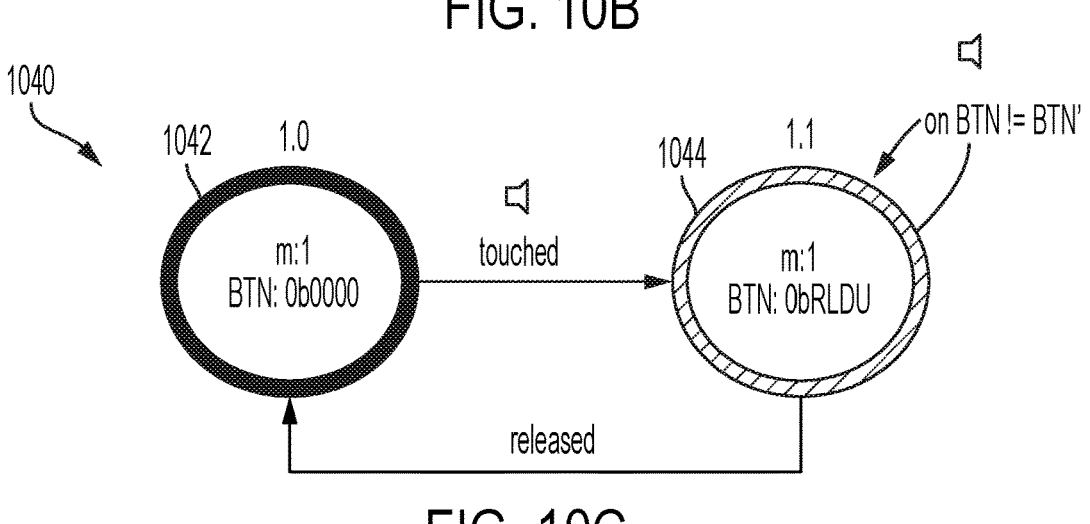

FIG. 10C is an example finite state diagram for a direct input mode for a touchpad of a handheld controller according to some embodiments of the disclosure.

Figure 10D:
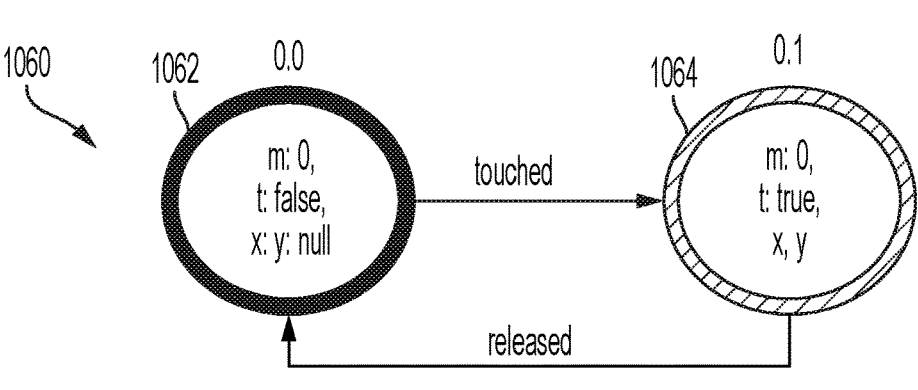

FIG. 10D is an example finite state diagram for a touch input mode for a touchpad of a handheld controller according to some embodiments of the disclosure.

Figure 10E:
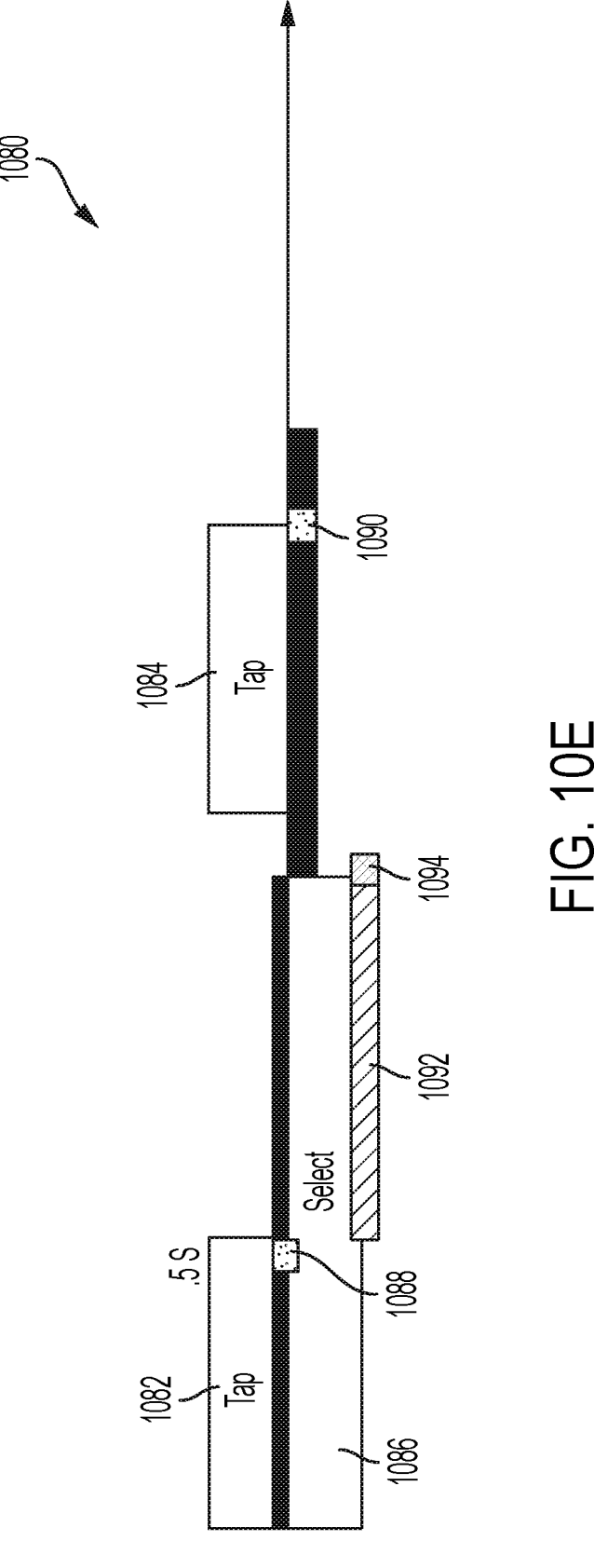

FIG. 10E is an example timing diagram for a wheel select input mode for a touchpad of a handheld controller according to some embodiments of the disclosure.

FIG. 11 is a flow chart of an example method for display of graphical overlays corresponding to an input mode of a handheld controller according to some embodiments of the disclosure.

FIG. 12 is a flow chart of an example method for input using a wheel select input mode for a touchpad of a handheld controller according to some embodiments of the disclosure.

Figure 13:
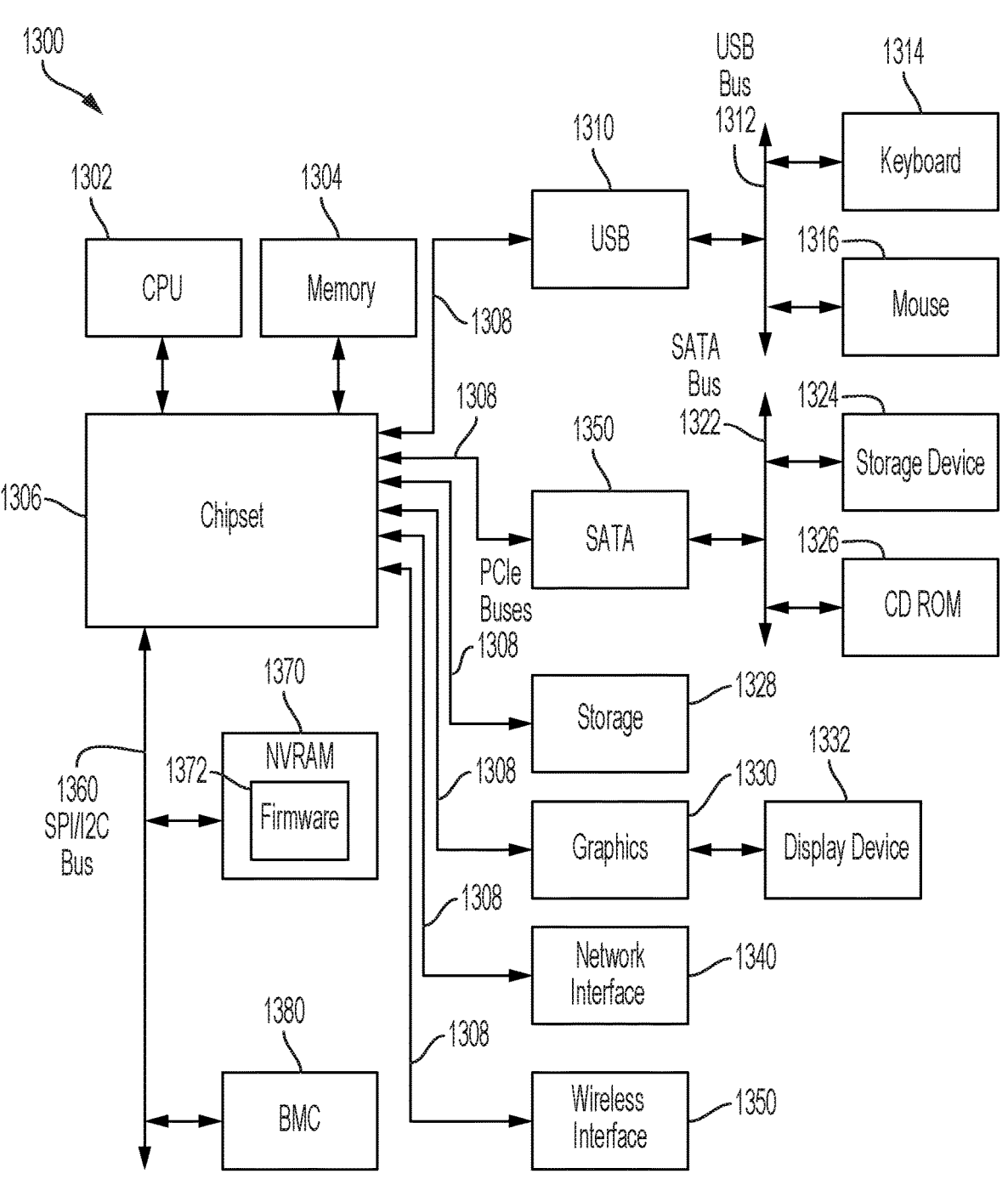

FIG. 13 is a schematic block diagram of an example information handling system according to some embodiments of the disclosure.

DETAILED DESCRIPTION

These example embodiments describe and illustrate various aspects of a configurable and dynamic gaming environment that can be supported through the use of a hub device, which may be an information handling system. A hub device may be located in a user's home and used to arrange game play sessions (or more generically application sessions) between host devices and services. The host devices may execute an application for receiving an AV stream for displaying rendered content from a game play session (or other application session), and in some configurations also receive user input for interacting with the session from a peripheral device, such as a gaming controller. The AV stream presented by the host device may be generated by a service. The service may execute on the hub device or another information handling system, such as a cloud computing resource. A home may include one or several host devices (e.g., televisions, mobile computers, tablet computers, and personal computers) and may include one or several information handling systems executing the service (e.g., a hub devices and personal computers).

The user's home may be divided into different environments defined by a space around a host device. For example, a living room with a television may be one environment and a bedroom with a personal computer may be another environment. A user may use a peripheral device in one of the environments and the hub device may configure a host device, a service, and the peripheral device for operation in the environment by determining the corresponding environment using a knowledge graph. The knowledge graph provides a database of historical information about the environments from which the hub device may use current characteristics of the peripheral device to deduce the location, and thus current environment, of the peripheral device. For example, the knowledge graph may include information about location of rooms (e.g., environments) in the house based on wireless signatures of devices within the different rooms. This difference in signatures reflects that a device on a one side of the house may receive beacon signals from different neighboring access points than a device on an opposite side of the house. When a user carries the peripheral device around the house, the hub device may determine a location of the peripheral device based on visible access points to the peripheral device. Other example characteristics beyond wireless signature for determining location are described in further detail below, and the knowledge graph may be used to combine different characteristics to identify the location, and thus environment, of the peripheral device.

Based on the location of the peripheral device determined from the knowledge graph, the hub device may initialize an application session for the peripheral device by determining an appropriate host device and service for the application session. For example, if the peripheral device is in the living room and is requesting a game that is within the capabilities of the service on the hub device to execute, the hub device may initialize an application session for the peripheral device between the television as a consumption device and the hub device as a service. The service on the hub device executes the game and streams rendered content to an application executing on the television consumption device.

The hub device may be used to migrate the peripheral device to a different environment and/or migrate the application session between host devices and/or services. For example, initially the application session may use a communication link between the peripheral device and the television host device for receiving user input, in which the application executing on the television host device relays user input to the service through a backhaul communication link from the television host device to the hub device. During the application session, the hub device may monitor characteristics of the peripheral device, including signal strength of connection to other components, and determine that the communication link from the peripheral device to the hub device is stronger than the peripheral device to the television host device. The hub device may migrate the peripheral device to a communications link with the hub device such that the service executing on the hub device directly receives the user input but the streaming session continues from the service to the application executing on the television host device. Such a change is illustrated in the change in configuration from FIG. 3A to the configuration of FIG. 3B described in further detail below.

Other aspects of the application session may also be migrated. For example, if the peripheral device is determined to move to a different environment, then the hub device may migrate the application session to an application executing on a host device within the new environment. As another example, if a connection between the television host device and the service becomes unstable, the hub device may recommend and/or initiate a migration of the application session to a different host device. One scenario for such a migration may be where the television host device is connected through a wireless link to the service in which the wireless link quality is reducing quality of the streaming and a second host device with a wired connection is available in a nearby environment. Each of these example migrations may be determined based on information in the knowledge graph regarding locations of environments and capabilities within those environments. As yet another example, a user may request execution of an application, such as a particular game, during the application session for which a better configuration exists than the current host device and/or current service. The request for a different application, such as a game requiring a certain GPU capability, may cause the hub device to determine that a second device executing a second service is better for hosting the application and migrate the peripheral device to the second service by, for example, reconfiguring network connections.

The hub device may support connecting to multiple peripheral devices. In one example, the hub device may support two peripheral devices using a shared session on one host device to play the same or different games on the host device. In another example, the hub device may support two peripheral devices in different environments using different sessions with different host devices. The hub device may determine the environment of each of the peripheral devices based on characteristics of the device and the knowledge graph and configure application session for each of the peripheral devices accordingly. Different arrangements of peripherals and players may be supported. For example, one hub device executing a service and one host device executing an application can support a configuration with Game A and one player (P1) with peripheral (C1) and Game B and one player (P2) with peripheral (C2); or can support a configuration with Game A and one player (P1) with peripheral (C1) and Game A and one player (P2) with peripheral (C2); or can support a configuration with Game A and two players (P1, P2) with peripherals (C1, C2).

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
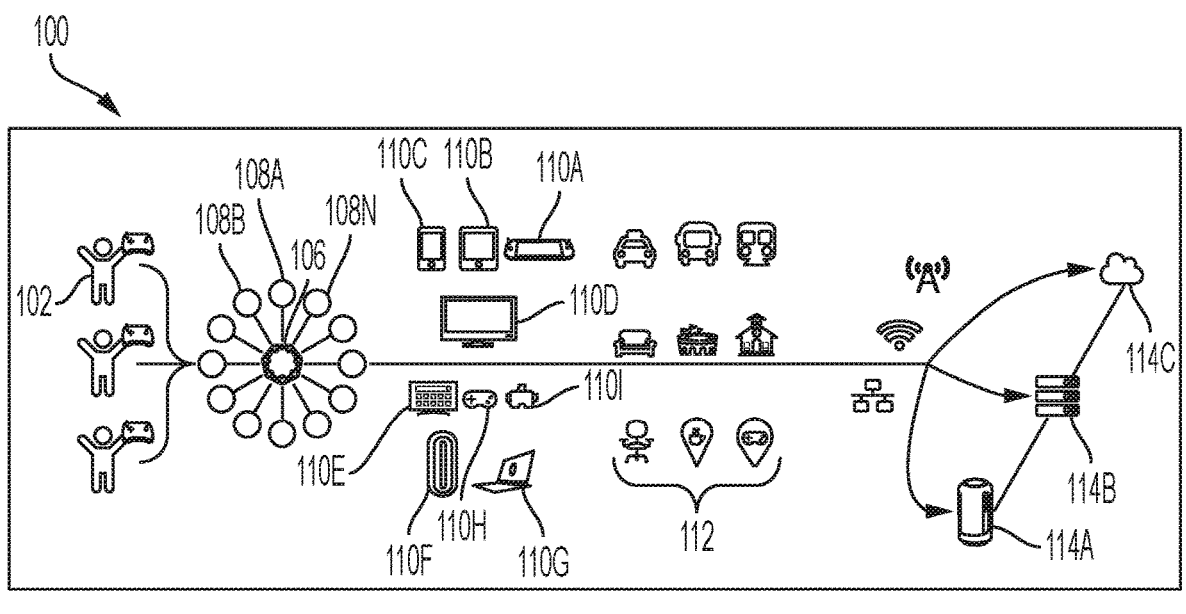
FIG. 1 is a block diagram illustrating aspects of a configurable system for providing services to users according to some embodiments of the disclosure.

FIG. 1 is a block diagram illustrating aspects of a configurable system for providing services to users according some embodiments of the disclosure. A system 100 includes users 102 who may have access to a shared library of applications 106 including applications 108A-108N. The users 102 may have separate libraries, with some overlapping applications between the libraries. The users 102 may access the library 106 through devices 110A-I, such as mobile gaming device 110A, tablet computing device 110B, phone computing device 110C, television 110D, personal computing device 110E, desktop computing device 110F, laptop computing device 110G, game controller 110H, VR headset 110I. The devices 110 may access services at any of locations 112, including cars, busses, homes, hotels, offices, parks, etc. One or more of the devices 110 may communicate with an application session executing on a computing device 114, such as a home application hub 114A, a server 114B, or a cloud execution environment 114C. In some embodiments, environments may only exist for fixed devices, e.g., desktop computers, televisions, etc.

Figure 2:
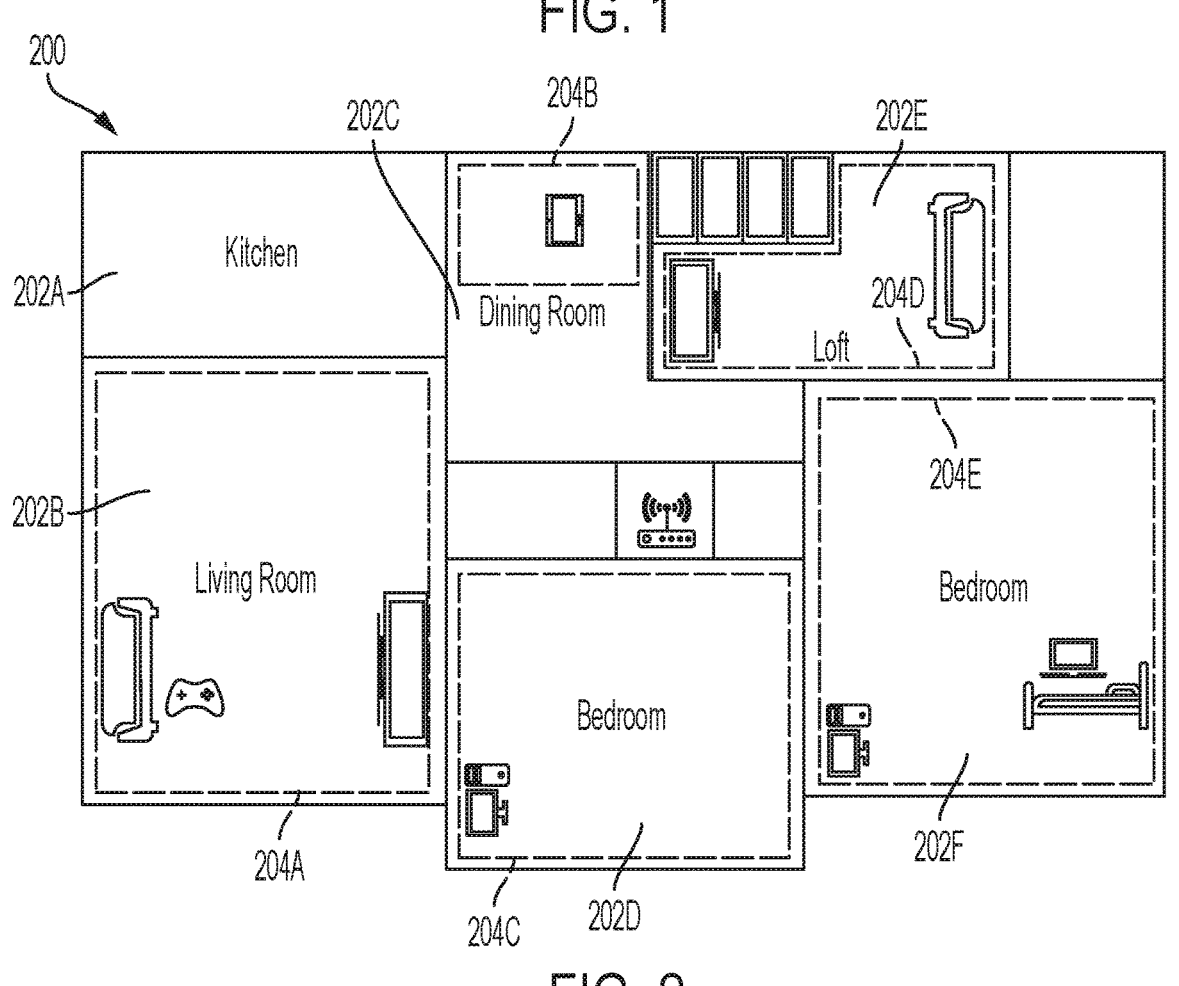
FIG. 2 is a block diagram illustrating possible game environments according to some embodiments of the disclosure.

FIG. 2 is a block diagram illustrating possible game environments according to some embodiments of the disclosure. A user's home 200 may include rooms 202A-F, and each of the rooms may have different information handling systems present, different AV equipment present, and/or different characteristics. For example, a living room 202B may include a large-size television, a bedroom 202D may include a personal computer, and a dining room 202C may include a table computing device. Gaming environments 204A-E in the home 200 may be defined based on spaces where a user is likely to execute an application session. Each gaming environment 204A-E may include numerous devices and gaming environments, devices that may or may not be capable of hosting games, and/or devices that may or may not be capable of receiving game output. A system 100 may allow multiple users in the home 200 to simultaneously execute an application session. In some embodiments, multiple games may be hosted on a single device. In some embodiments, multiple games may target a single output device. In some embodiments, solution manages where games should be hosted, where game output should go, and how to best route peripheral I/O for users.

A user may move between gaming environments 204A-E within the home 200 and continue an application session. For example, a user may take a device, such as a gaming controller, from environment 204A to environment 204C. The gaming controller may migrate and reconfigure for operation in environment 204C from a configuration for environment 204A. For example, the controller may transition from an application hosted on a TV in living room 202B to an application hosted on TV in dining room 202C while remaining connected to a host service executing on a PC in bedroom 202D.

Figure 3A:
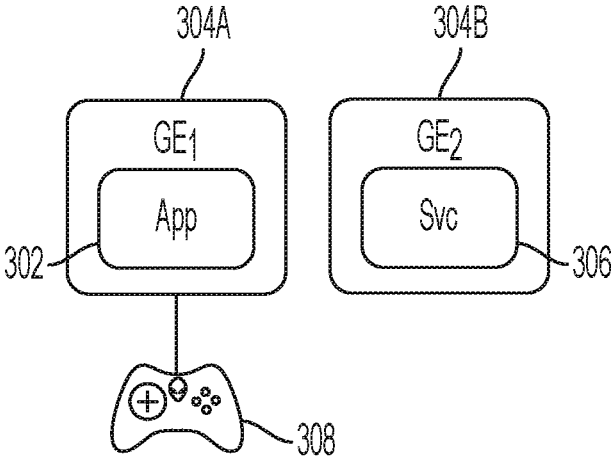
FIG. 3A is a block diagram illustrating application and services hosted in different gaming environments according to some embodiments of the disclosure.

Example configurations for applications and services in gaming environments are shown in FIGS. 3A-3D. FIG. 3A is a block diagram illustrating application and services hosted in different gaming environments according to some embodiments of the disclosure. In FIG. 3A, a first gaming environment 304A may include a device, such as a TV or PC, hosting an application 302, which is an endpoint for an application session such as a gaming session. The application 302 communicates with a service 306, which may be hosted on a device in a different gaming environment 304B. A controller 308 may communicate with the application 302 to receive user input for the application session to control, for example, a character in a game. In some embodiments, the controller 308 is connected to the environment 304A hosting the application and the I/O is configured to be relayed to the environment 304B hosting the actual game.

Figure 3B:
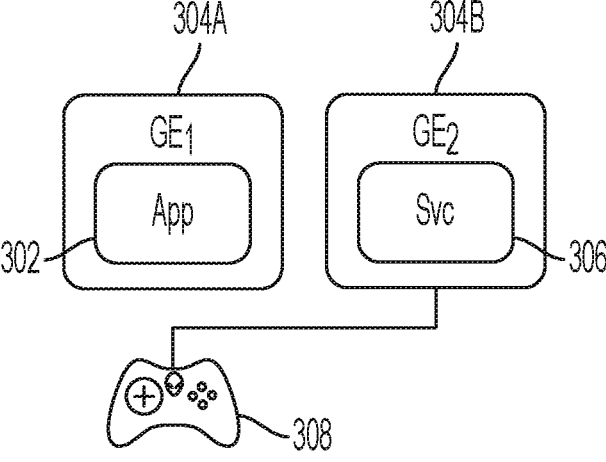
FIG. 3B is a block diagram illustrating application and services hosted in different gaming environments according to some embodiments of the disclosure.

Another arrangement for the application and service is shown in FIG. 3B. FIG. 3B is a block diagram illustrating application and services hosted in different gaming environments according to some embodiments of the disclosure. In FIG. 3B, the controller 308 communicates with the service 306 for providing user input to an application session, with the AV rendering target of the application session being application 302 in a different gaming environment.

Figure 3C:
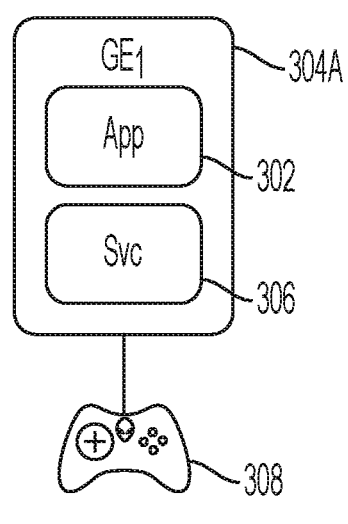
FIG. 3C is a block diagram illustrating application and service hosted in a common gaming environment according to some embodiments of the disclosure.

Another arrangement for the application and service is shown in FIG. 3C. FIG. 3C is a block diagram illustrating application and service hosted in a common gaming environment according to some embodiments of the disclosure. In FIG. 3C, the application 302 and the service 306 are executed in the same gaming environment 304A, which may be a single device, two devices, or a combination of devices in the gaming environment 304A. The controller 308 may communicate with either the service 306 and/or the application 302.

Figure 3D:
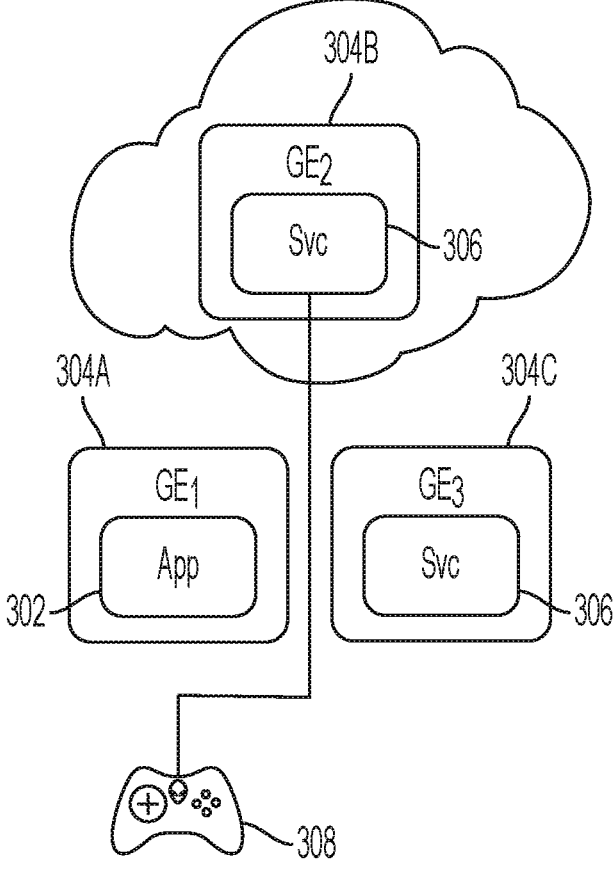
FIG. 3D is a block diagram illustrating a cloud-based service arrangement for a gaming environment according to some embodiments of the disclosure.

A further arrangement for the application and service is shown in FIG. 3D. FIG. 3D is a block diagram illustrating a cloud-based service arrangement for a gaming environment according to some embodiments of the disclosure. In FIG. 3D, the controller 308 may communicate with a service 306 hosted in a gaming environment 304B that is remote from the gaming environment 304A in which the application 302 is executing. The service 306 may be executing, for example, on a remote device, such as when the user's home includes the gaming environment 304B but the user is engaging with application 302 at a location on a different network from their home (e.g., at a friend's house). The service 306 may also or alternatively be executed, for example, on a cloud computing device available as a subscription service to the user.

Figure 4:
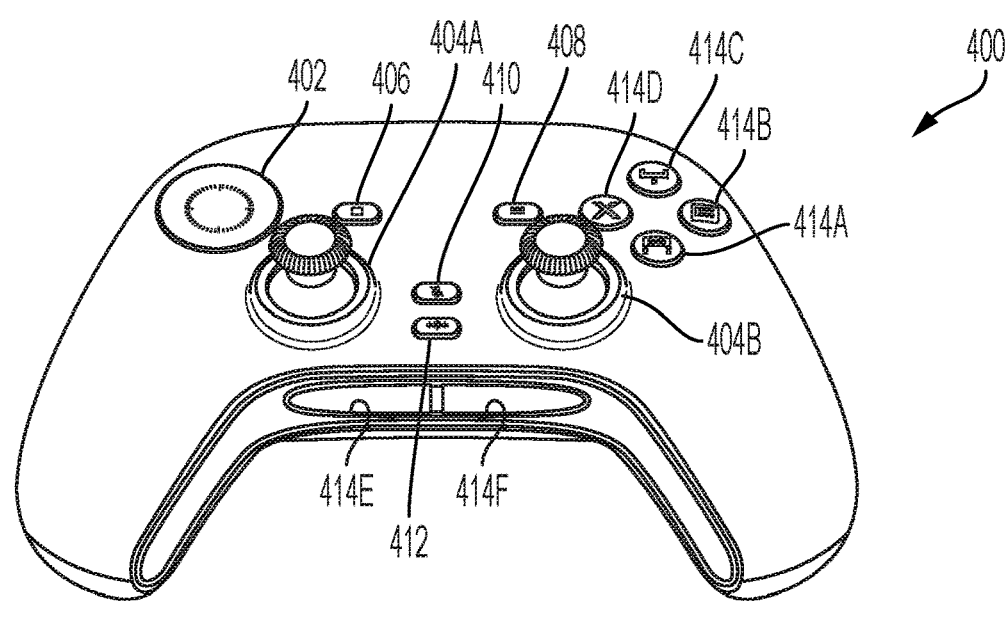
FIG. 4 is a perspective view of a handheld controller according to some embodiments of the disclosure.

Input devices, such as keyboards, mice, handheld controllers, and other input devices may be connected to information handling systems to allow users to manipulate information using an information handling system. An example handheld controller 400 is shown in FIG. 4. The handheld controller 400 may include a variety of input mechanisms for use by a user. For example, the handheld controller 400 may include buttons 406, 408, 410, 412, 414A-F and control sticks 404A-B. The handheld controller may include a touchpad 402, which may be referred to as an omnipad. In some embodiments, the touchpad 402 may be circular. The touchpad 402 may be configured to sense pressing of the touchpad 402 and movement of one or more fingers across a surface of the touchpad 402. The touchpad 402 may also be able to sense pressure applied to the touchpad by a user for additional input. For example, the touchpad 402 may be able to sense a portion of the touchpad 402 that is pressed, such as a top portion of the touchpad 402, a bottom portion of the touchpad 402, a left portion of the touchpad 402, a right portion of the touchpad 402, or an inner portion of the touchpad 402. In some embodiments, the handheld controller 400 may include a biometric scanner in one of buttons 406, 408, 410, 412, 414A-F, control sticks 404A-B, or touchpad 402 for determining an identity of a user for loading a user profile for the user.

The handheld controller 400, which may also be referred to as a gaming controller, may provide input to an information handling system for an application being executed by the information handling system. For example, the handheld controller 400 may communicate with a service and/or an application executed by an information handling system, as described herein. The handheld controller 400 may be configurable to operate according to a variety of input modes. Such input modes may include different configurations for receipt and transmission of input received via the touchpad 402. In some embodiments, a user profile for a user of the controller 400 may include information regarding input modes that should be activated depending on an environment for which input is being received from the controller 400, such as one or more applications for which input is being received from the controller 400.

Figure 5:
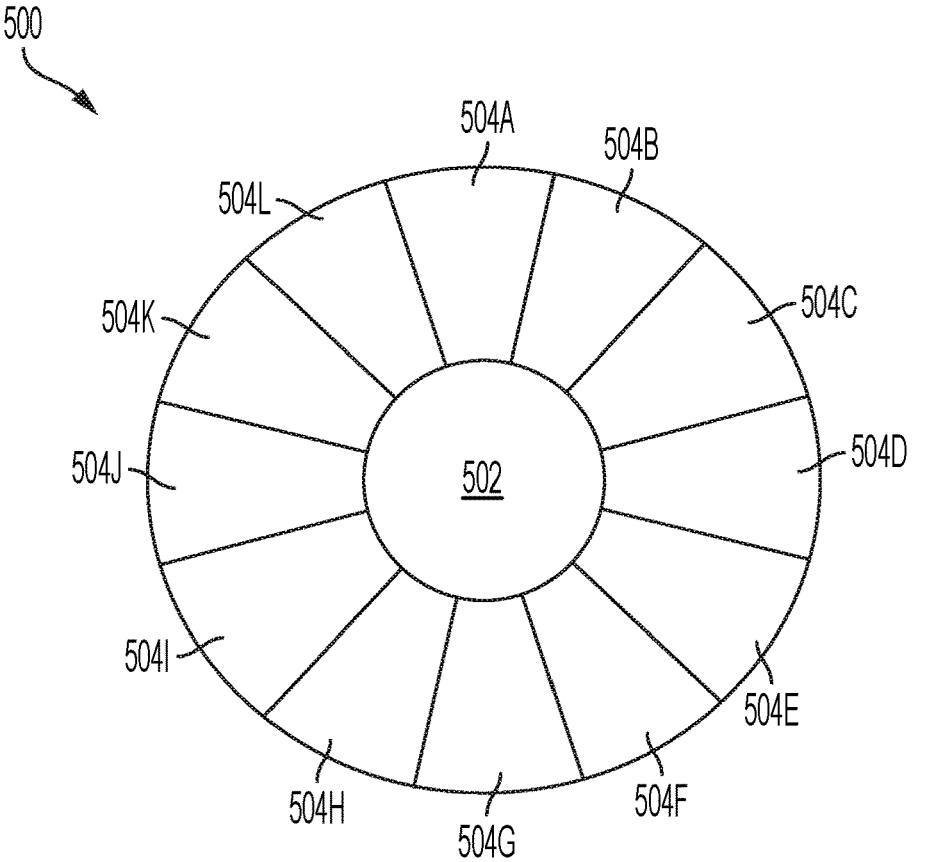
FIG. 5 is a layout of an example touchpad of a handheld controller according to some embodiments of the disclosure.

An example layout 500 of a touchpad, such as the touchpad 400 of FIG. 4, is shown in FIG. 5. The touchpad 500 may, for example, be divided into an inner portion 502 and an outer portion 504A-L. In some embodiments, the outer portion 504A-L of the touchpad 500 may be divided into a plurality of equal wedges or areas, such as up to or more than twelve areas. In some embodiments, the outer portion 504A-L of the touchpad 500 may be divided into a plurality of wedges or areas of differing sizes. The touchpad 500 may be configured to receive input in a variety of modes. In some embodiments, an active mode of the touchpad 500 may adjust a content of input information transmitted from a handheld controller including the touchpad 500 to an information handling system. In some embodiments the active mode of the touchpad 500 may adjust an interpretation of input received by an information handling system from the handheld controller.

For example, a first mode of the touchpad 500 may be a touchpad mode. When the touchpad is configured to operate in a touchpad mode, the handheld controller may transmit coordinates, such as XY coordinates, to a connected information handling system when the touchpad is touched. As one example, when a user moves a finger across the touchpad 500, the handheld controller may transmit multiple XY coordinates corresponding to multiple positions at which the finger touched the touchpad 500. Timing information for when the coordinates were recorded by the handheld controller may also be transmitted The information handling system may then perform one or more actions based on the received coordinates, such as moving a cursor.

As another example, a second mode of the touchpad 500 may be a swipe mode. When the swipe input mode is activated, the handheld controller including the touchpad may transmit an indication of swiping from an inner portion 502 of the touchpad to an area, such as area 504B, of an outer portion of the touchpad. For example, when the swipe mode is activated, the handheld controller may detect an area of a plurality of areas 504A-L of the outer portion of the controller at which a finger of a user is removed after the finger contacts the touchpad at the inner portion 502 and may transmit an indication of the area of the plurality of areas 504A-L to an information handling system. In some embodiments, the outer portion of the touchpad 500 may include twelve, or more or fewer than twelve, areas, with each area corresponding to an action. When the input indicating the selected area is received by an information handling system, the information handling system may perform the action corresponding to the selected area. In some embodiments, when the swipe mode is determined for the touchpad of the handheld controller, the controller may transmit coordinate data indicating portions of the touchpad 500 that were touched during a swipe, and a receiving information handling system may determine an area at which the swipe ended based on the coordinate data to determine the action selected by the user. The areas of the outer portion of the touchpad 500 may, for example, be areas bounded by equal angular arcs of an outer border of the touchpad 500. In some embodiments, the handheld controller may support multiple swipe input modes, with each swipe input mode having different actions assigned to different inputs, such as different inputs for different environments for which input may be received. In some embodiments, the handheld controller may support multiple swipe input modes for a single application, with different inputs mapped to different areas of the outer portion depending on a determined swipe input mode for the handheld controller.

As another example, a third mode of the touchpad 500 may be a wheel select input mode. When the wheel select input mode is activated, the handheld controller including the touchpad may, when an inner portion 502 of the touchpad 500 is pressed and a finger of a user is moved from the inner portion 502 to an area, such as area 504B, of the outer portion of the touchpad 500, transmit an indication of such input to a connected information handling system. For example, similar to when the swipe mode is activated, the handheld controller may detect an area of a plurality of areas 504A-L of the outer portion of the controller at which a finger of a user is removed after the finger presses the touchpad at the inner portion 502 for a predetermined period of time, such as 0.5 seconds, and may transmit an indication of the area of the plurality of areas 504A-L to an information handling system. In some embodiments, the handheld controller may also transmit an indication of pressing of the inner portion 502 of the controller to the information handling system for the predetermined period of time. Such a combination of inputs may be referred to herein as a select input. In some embodiments, the outer portion of the touchpad 500 may include twelve, or more or fewer than twelve, areas, with each area corresponding to an action. When the wheel select mode is activated the information handling system may, in response to receipt of an indication of input selecting an area of the outer portion of the touchpad 500 corresponding to a selected action, save or map the action to pressing of the touchpad 500. The handheld controller may then receive an input from a user touching or pressing the touchpad 500, following selection of an action, and an indication of the input may be transmitted to the information handling system. When an input from the handheld controller indicating pressing or touching of the touchpad is subsequently received, the information handling system may perform the action corresponding to the selected area of the outer portion of the touchpad 500. In some embodiments, when the wheel select mode is activated, the controller may transmit coordinate data indicating portions of the touchpad 500 that were touched and/or one or more indications of pressing of the touchpad 500, and a receiving information handling system may determine a selected area of the outer portion of the touchpad 500 based on the coordinate data to determine the action selected by the user. In some embodiments, the indication of pressing or touching of the inner portion 502 the touchpad 500 received from the handheld controller may include an indication that the inner portion 502 of the touchpad 500 was pressed or touched for at least a predetermined period of time, such as 0.5 seconds. An indication of pressing or touching of the touchpad 500 triggering performance of the action may, for example, include an indication of pressing or touching of the touchpad for less than a predetermined period of time, such as less than 0.5 seconds. Such pressing of the touchpad may be referred to herein as a tap input. Thus, after an action is selected, a user may select a new action to be performed by pressing the inner portion 502 of the touchpad 500 for more than 0.5 seconds or may instruct the information handling system to perform the previously selected action by pressing the inner portion 502 of the touchpad for less than 0.5 seconds. In some embodiments, the handheld controller may support multiple wheel select input modes, with each wheel select input mode having different actions assigned to different inputs, such as different inputs for different environments for which input may be received. In some embodiments, the handheld controller may support multiple wheel select input modes for a single application, with different inputs mapped to different areas of the outer portion depending on a determined wheel select input mode for the handheld controller.

As another example, a fourth mode of the touchpad 500 may be a direct input mode. When the direct input mode is activated, the handheld controller including the touchpad 500 may transmit an indication of a portion of the touchpad 500, such as a quarter of the touchpad pressed or touched, and pressing or touching of each quarter of the touchpad may correspond to a different action. For example, the touchpad 500 may be divided into four equal wedges bordered at the exterior by four equal angular arcs. For example, a first wedge may include areas 504A, 504B, and 504L, a second wedge may include areas 504C-E, a third wedge may include areas 504F-H, and a fourth wedge may include areas 504I-K. Likewise, each wedge may include a corresponding portion of the inner portion 502 of the touchpad 500. The information handling system may, when an indication of a wedge that was pressed is received from the handheld controller, perform an action corresponding to the pressed wedge. In some embodiments, the wedges may correspond to inputs of a D-pad. For example, the first wedge may correspond to an up input of a D-pad, the second wedge may correspond to a right input of a D-pad, the third wedge may correspond to a down input of a D-pad, and the fourth wedge may correspond to a left input of a D-pad. In some embodiments, when the D-pad mode is activated, the controller may transmit coordinate data indicating a portion of the touchpad 500 that was pressed, and a receiving information handling system may determine wedge that was pressed based on the coordinate data to determine and perform the action selected by the user. In some embodiments, the handheld controller may support multiple direct input modes, with each direct input mode having different actions assigned to different inputs, such as different inputs for different environments for which input may be received. In some embodiments, the handheld controller may support multiple direct input modes for a single application, with different inputs mapped to different areas of the touchpad depending on a determined direct input mode for the handheld controller.

Figure 6:
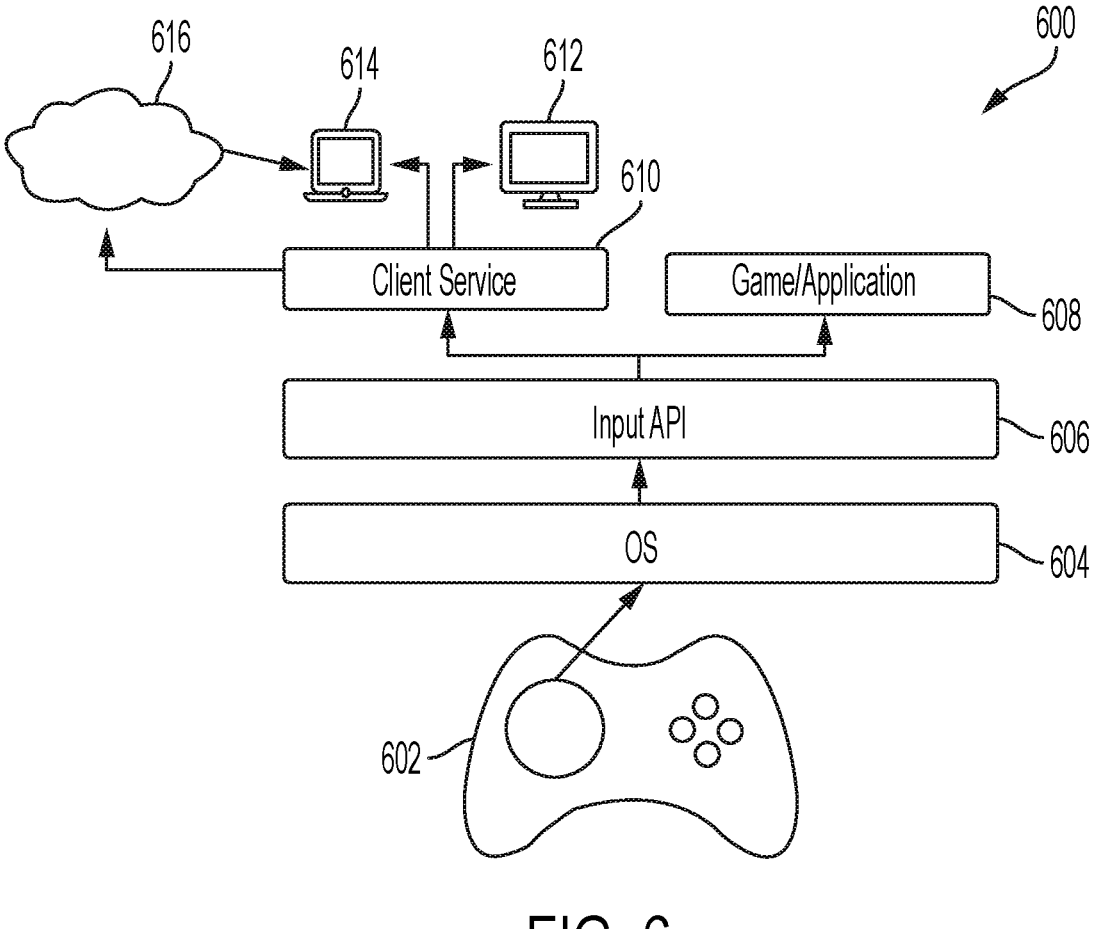
FIG. 6 is an example system for adjustable input modes for a handheld controller according to some embodiments of the disclosure.

An example, system for receiving and processing input of a handheld controller supporting different modes is shown in FIG. 6. The handheld controller 602 may be connected to one or more information handling systems. The handheld controller 602 may, for example, support a variety of input modes for a touchpad of the handheld controller 602, such as a touchpad input mode, a swipe input mode, a wheel select input mode, and a touchpad input mode. The handheld controller 602 may receive input from a user, such as pressing of a portion of a touchpad or one or more buttons of the handheld controller 602. The handheld controller 602 may provide input information corresponding to the received input to an operating system 604. The operating system 604 may, for example, be an operating system 604 executed by a host information handling system executing an application for which input is being received or a client information handling system functioning as an intermediary to display output information from the application and/or receive input information from the handheld controller 602. The operating system 604 may provide the input information from the handheld controller 602 to an input application programming interface (API) 606. Similar to the operating system, 604, the input API 606 may be executed by a host information handling system or a client information handling system. The input API 606 may provide the input information to an application 608 executed by the host information handling system, such as a gaming application. The application 608 may perform one or more actions based on the received input. The input API 606 may also provide the input information to a client service 610. The client service 610 may, for example, be executed by client information handling system to receive audio and visual information from the application 608 executed by a client information handling system for presentation to a user. The client service 610 may, in some embodiments, determine an input mode for the handheld controller 602 and may provide the determined input mode for the controller 602 to the input API 608 for use by the input API 606 in interpreting input information received from the handheld controller 602. In some embodiments, the client service may determine the input mode for the controller based on an application 608 for which the input is being received or based on a user profile of a user using the handheld controller 602. For example, the client service 610 may receive input information from the input API 606 including authentication information, such as biometric information or a username and password for the user, received from the handheld controller 602 for identifying a user of the controller. The client service 610 may then determine a user profile corresponding to the authentication information. In some embodiments, the client service 610 may request a user profile of the user from a cloud-based service 616. The user profile of the user may, for example, include information indicating specific input modes that should be activated for the controller when input is being received for specific applications. The client service 610 may then determine a specific application 608 for which input is being received and may activate an input mode for the controller 602 based on the application and the user profile. The client service may, in some embodiments, communicate with a first information handling system 614, such as a host information handling system executing the application 608, and a second information handling system 612, such as a client information handling system displaying or receiving input for the application 608 executed by a host information handling system.

The client service 610 may be executed on one or more information handling systems different from an information handling system on which the application 608 is executed, and the client service 610 may receive audio, video, and other input from the information handling system executing the application 608 through the input API 606. In some embodiments, the client service 610 may receive input from the handheld controller 602 and may provide the input from the handheld controller 602 to the information handling system executing the application 608. In some embodiments, the client service 610 may include an application executed by a client information handling system.

Figure 7:
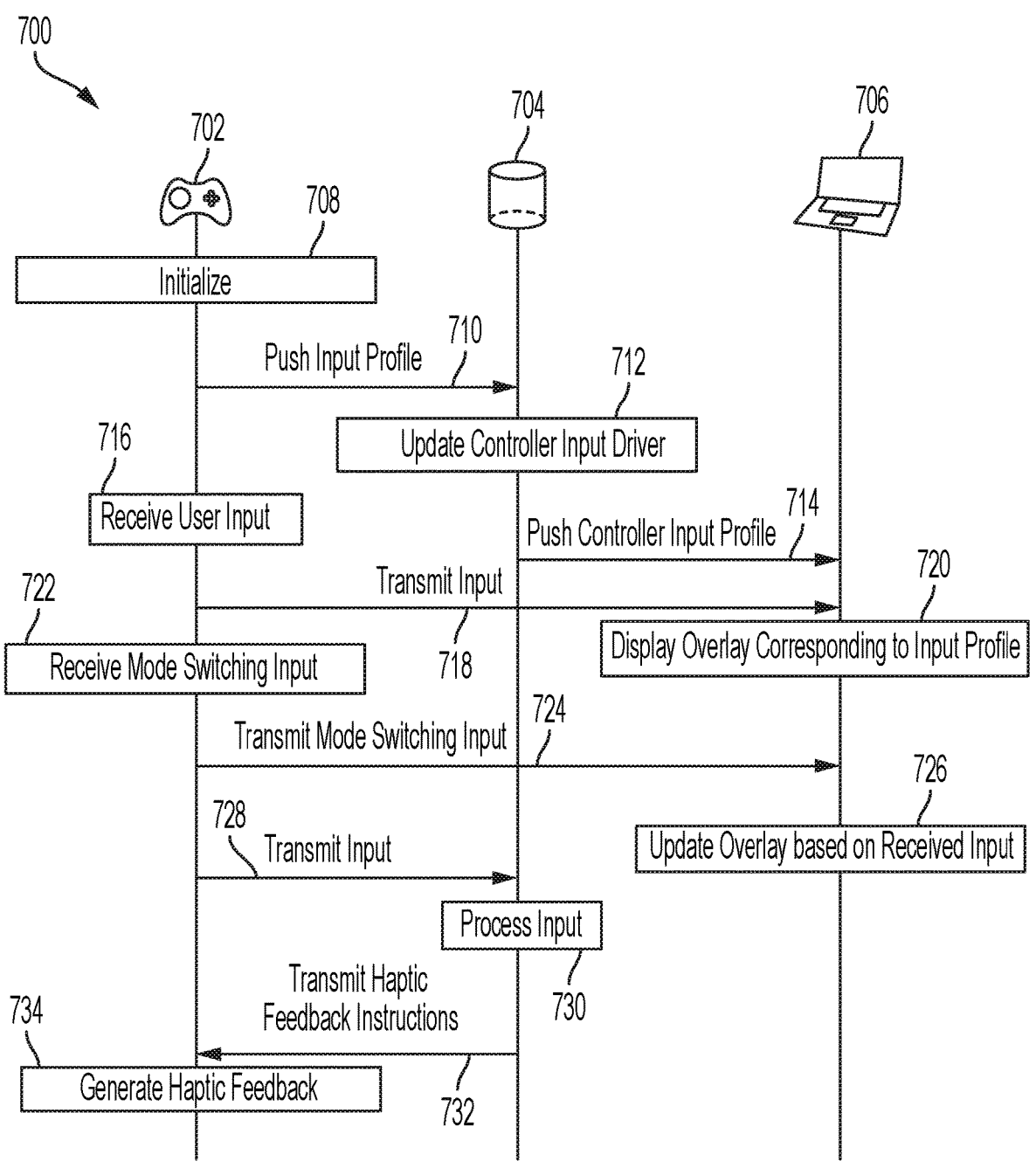
FIG. 7 is an example process flow diagram for receiving input from a handheld controller according to some embodiments of the disclosure.

An example process flow diagram 700 of a process for receiving input from a controller configurable to operate using adjustable input modes is shown in FIG. 7. A handheld controller 702 may communicate with a host information handling system 704 and a client information handling system 706. In some embodiments, the host information handling system 704 may be an information handling system executing an application for which input is being received, such as a gaming application, and the client information handling system 706 may execute a service for receiving input, visual, and/or audio information from the host information handling system 704 for presentation to a user. In some embodiments, the host information handling system 704 and the client information handling system 706 may be a same information handling system. In some embodiments, the host information handling system 704 may be a desktop personal computer or server, while the client information handling system 706 may be a smart television, streaming box, or other information handling system.

At block 708, the handheld controller 702 may initialize. For example, the handheld controller 702 may connect to the host information handling system 704 and the client information handling system 706. In some embodiments, such initialization may include receiving authentication information from a user, such as biometric authentication information. Such authentication information may, for example, include a voice print or a finger print of the user obtained through a biometric scan. In some embodiments, initialization of the handheld controller 702 may include loading of an input profile for the user. Loading the input profile may include accessing an input profile stored on the handheld controller 702, communicating with a cloud-based service to load the input profile, such as by transmitting user identification information such as biometric authentication information of the user to the cloud-based service, or otherwise loading the input profile. The input profile may, for example, be a part of a user profile for the user and may indicate a plurality of input modes associated with a plurality of environments for which input may be received. For example, the input profile may indicate specific input modes that should be used when receiving input for specific applications or services.

At 710, the handheld controller 702 may push an input profile to the host information handling system 704. In some embodiments, the handheld controller 702 may push user identification information, such as user authentication information, to the host information handling system 704, which may allow the host information handling system 704 to load an input profile associated with the user for the handheld controller 702 from a cloud-based service or from a memory of the host information handling system 704. In some embodiments, the pushed input profile may, for example, include one or more input modes for the handheld controller associated with one or more environments, such as one or more applications for which input may be received. Alternatively or additionally, the pushed input profile may indicate a particular input mode for the handheld controller that should be activated by the host information handling system 704.

At block 712, the host information handling system 704 may update the input driver for the handheld controller 702. Updating the input driver may, for example, include updating a controller input driver executed by the host information handling system 704 according to an activated input mode for the handheld controller. For example, an input driver for the handheld controller 702 on the host information handling system 704 may be updated to interpret input information received from the handheld controller according to a determined input mode for the handheld controller. For example, an input driver for the handheld controller 702 on the host information handling system 704 may be updated to process input information received from the handheld controller 702 according to an activated input mode for the handheld controller 702 based on an environment for which input is being received, such as a particular application for which input is being received. For example, the input driver for the handheld controller 702 may be updated to interpret input received for a touchpad of the handheld controller 702 according to a wheel select input mode, a direct input mode, a touchpad input mode, or a swipe input mode.

The host information handling system 704 may push the input profile for the handheld controller 702 to the client information handling system 706. In some embodiments, pushing the input profile may include transmitting a full input profile including multiple input modes associated with multiple environments. In some embodiments, pushing the input profile for the handheld controller 702 may include transmitting an indication of an activated input mode, such as an input mode activated by updating the controller input driver at 712. For example, the host information handling system 704 may notify a service executed by the client information handling system 706 of an activated input mode for the handheld controller 702. In some embodiments, the handheld controller 702 may directly notify the client information handling system 706 of an activated input mode and/or an input profile for the handheld controller.

At 716, the handheld controller may receive user input. For example, the handheld controller may receive user input via a touchpad for an application executed by the host information handling system 704. At 718, the handheld controller 702 may transmit the input information to the client information handling system. For example, the input information received by the handheld controller 702 may be received by a service executed by the client information handling system 706. In some embodiments, the client information handling system 706 may forward the input information received from the handheld controller to the host information handling system 704, while in some embodiments the host information handling system 704 may receive the input information directly from the handheld controller. The host information handling system 704 may interpret the input information received from the handheld controller 702 according to the activated input mode of the handheld controller 702 and may perform one or more actions in the application executed by the host information handling system 704 for which input is being received.

At 720, the client information handling system 706 may display a graphical overlay on a display of visual information for the application executed by the host information handling system 704 based on a determined input mode of the handheld controller 702. For example, the client information handling system 706 may display an overlay on a window for the application executed by the host information handling system 704 for which input is being received. In some embodiments, the host information handling system 704 may adjust visual output for the application executed by the host information handling system 704 transmitted to the client information handling system to include an overlay generated by the host information handling system to include an overlay corresponding to an input mode determined for the handheld controller 702. In some embodiments, a service executed by the client information handling system 706, such as a service for receiving video and audio data for the application executed by the host information handling system 704, may determine the input mode, such as based on the pushed controller input profile, and may generate and display a graphical overlay based on the input mode for the handheld controller 702. In some embodiments, the overlay may be adjusted based on input received at 718, such as to indicate reception of input corresponding to a particular action. Thus, a graphical overlay corresponding to the input mode of the handheld controller 702 may be displayed by the client information handling system 706.

A user may also provide input to a handheld controller 702 to adjust an input mode of the handheld controller. At 722, the handheld controller 702 may receive mode switching input from the user. For example, a user may use the handheld controller to generate input indicating an adjustment to the environment, such as switching from providing input to a first application, associated with a first input mode for the user, executed by the host information handling system 704 to providing input to a second application, associated with a second input mode for the user, executed by the host information handling system 704. As another example, the mode switching input may include one or more adjustments to a user profile, such as a change in an input mode that is associated with a particular environment. In some embodiments, the handheld controller 702 may adjust an input profile of a user profile stored on the handheld controller based on the received mode switching input.

At 724, the handheld controller 702 may transmit the mode switching input to the client information handling system 706. In some embodiments, the handheld controller may also transmit the mode switching input to the host information handling system to allow the host information handling system to update the controller input driver. At 726, the client information handling system may update the overlay based on the received mode switching input. For example, the graphical overlay may be adjusted to reflect the new input mode for the handheld controller. In some embodiments, such an update may be performed by receiving new visual data for an application executed by the host information handling system 704, adjusted to include the updated graphical overlay, from the host information handling system 704.

At 728, the handheld controller 702 may transmit input received from a user to the host information handling system 704. The input information may, for example, be input received via a touchpad of the handheld controller 702. At 730, the host information handling system 704 may process the input. For example, the host information handling system 704 may determine one or more actions to be performed in the application being executed by the host information handling system 704 based on the received input and an input mode of the handheld controller. Such processing may also include one or more instructions for haptic feedback to be transmitted to the handheld controller 702 based on the received input. At 732, the host information handling system 704 may transmit haptic feedback instructions to the handheld controller based on the received input. At block 734, the handheld controller may generate haptic feedback, such as haptic feedback of the touchpad, based on haptic feedback instructions received from the host information handling system 704.

Figure 8A:
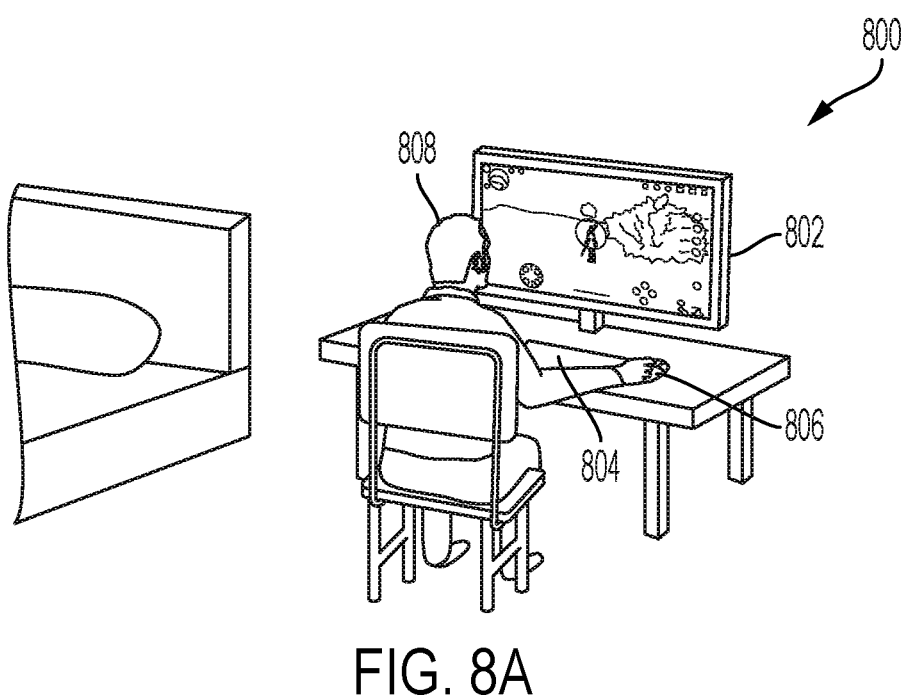
FIG. 8A is an example information handling system usage context according to some embodiments of the disclosure.
Figure 8B:
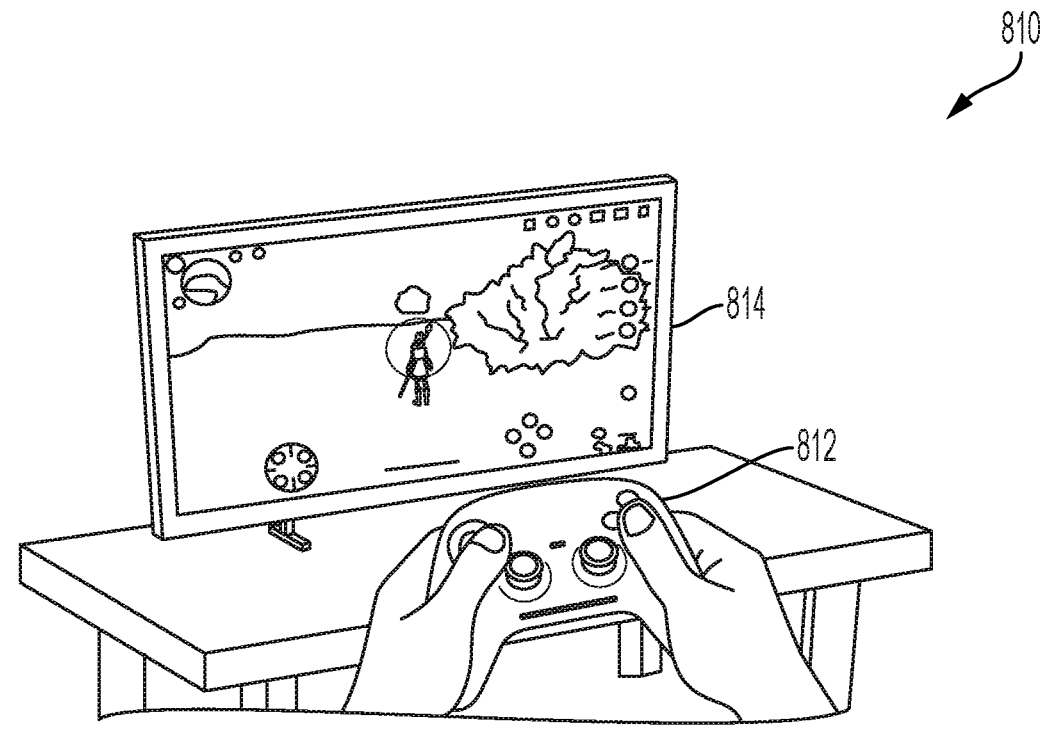
FIG. 8B is an example information handling system usage context according to some embodiments of the disclosure.

A same application may be accessed in multiple different usage environments. When a user uses a handheld controller to provide input for an application, an input mode for the handheld controller may be determined based on the application and based on a user profile of the user. A first example usage environment 800, such as a desktop, is shown in FIG. 8A. A user 808 may launch an application, such as a gaming application, on a first information handling system 802, such as a personal computer. The user may provide input to the application using a keyboard 804 and a mouse 806. In some embodiments, the first information handlings system 802 may load a user profile for the user and may determine an input mode for the keyboard 804 and mouse 806 based on a user profile of the user 808. For example, custom key mappings for the keyboard 804 may be mapped to specific actions in the application executed by the information handling system 802 such that when certain keys are pressed, the information handling system 802 will perform the mapped actions in the application. As one example, up to or more than twenty custom actions may be mapped to specific inputs of the keyboard 804 and the mouse 806. In some embodiments, the user 808 may pause the game, and may move to a new usage environment, such as the usage environment 810 of FIG. 8B. The usage environment 810 may, for example, be a living room environment with a different information handling system 814, such as a smart television. The information handling system 814 may, for example, be a client information handling system running a service to receive visual and audio data for an application executed by the information handling system 802, which may be a host information handling system. The user 808 may activate the handheld controller 812, and the service executed by the information handling system 814 may begin displaying visual information from the application executed by the information handling system 802. Thus, the user may resume use of the application at the information handling system 814. A user profile for the user 808 may indicate an input mode for the handheld controller 812 that should be activated for an environment for which input is being received, such as the specific application for which input is being received from the handheld controller. Thus, the user profile may include input modes for both the keyboard 804 and mouse 808 combination and the handheld controller 812 associated with specific environments, such as specific applications. For example, the input mode for the handheld controller 812 for the application being executed by the information handling system 802 may include a wheel select input mode and/or a swipe input mode for a touchpad of the handheld controller 812. The information handling system 802 executing the application may determine the input mode for the handheld controller 812 and may interpret input received for the application from the handheld controller according to the determined input mode.

A graphical overlay corresponding to the determined input mode of the handheld controller 812 may be displayed on the display of the information handling system 814. For example, the graphical overlay may display actions that correspond to particular inputs of the handheld controller 812, such as particular inputs of the touchpad of the handheld controller 812. In some embodiments, the handheld controller 812 may provide input information and/or an indication of an input mode of the handheld controller to the information handling system 814 and a service of the information handling system 814, such as a service for displaying audio and visual information received from the information handling system 802, may generate and display such an overlay. In some embodiments, the information handling system 802 may adjust visual information for the application executed by the information handling system 802 to include the graphical overlay and may transmit the visual information including the graphical overlay to the information handling system 814. In some embodiments, the graphical overlay may be adjusted to indicate inputs received from the handheld controller, such as inputs corresponding to particular actions. In some embodiments, the information handling system 814 or the information handling system 802 may provide instructions for the handheld controller 812 to generate haptic feedback based on input information received from the handheld controller 812. Thus, the handheld controller 812 may, in some embodiments, provide input information to the information handling system 814, and the information handling system 814 may forward the input information to the information handling system 802 executing the application for which input is being received. In some embodiments, the handheld controller 812 may provide input information to the information handling system 802, and, in some embodiments, the information handling system 802 may forward the input information to the information handling system 814. In some embodiments, the handheld controller 812 may provide input information to both the information handling system 802 and the information handling system 814.

An example graphical overlay 902 for a display of an application, such as a gaming application, that corresponds to a determined input mode of a handheld controller is shown in FIG. 9A. For example, specific actions of the application, may be mapped to specific touch inputs as described herein, and such mapping may be indicated by a graphical overlay 902 for a display of an application 900. The graphical overlay 902 may, for example, include a graphical representation 902 of a touchpad of the handheld controller and may include indications of different inputs of the touchpad that correspond to different actions in the application 900. For example, the graphical overlay 902 may be a graphical overlay corresponding to a wheel select mode of the handheld controller. Each input 904A-E may correspond to a particular action that may be selected when a user presses an inner portion of a touchpad of the handheld controller for a period of time, such as 0.5 seconds or more, and swipes outward to an area of an outer portion of the touchpad of the handheld controller that corresponds to one of the inputs 904A-E. Input 904F shown at the center of the graphical overlay 902 may include an icon corresponding to an action selected by such swiping. Thus, the icon illustrated at the inner portion 904F of the graphical overlay may be adjusted based on selection of an action from one of the outer portions 904A-E based on input received from a handheld controller. Then when the user presses an inner portion of the touchpad of the handheld controller for a period of time, the action indicated by the inner portion 904F of the graphical overlay 902 may be performed. The graphical overlay 902 may be further updated to indicate input received from a controller, such as by highlighting a section of the overlay 902 corresponding to a received input. Thus, a graphical overlay, such as graphical overlay 902, corresponding to an input mode of a handheld controller, such as an input mode of a touchpad of a handheld controller, may be displayed and may include a graphical representation of the touchpad of the handheld controller.

As described herein, input modes for a handheld controller may correspond to an environment for which input is being received from the handheld controller. For example, a user profile for a user of a handheld controller may include a mapping of a plurality of input modes to a plurality of environments for which input may be received. An environment for which input may be received may, for example, include a particular application for which input is being received and/or a particular information handling system that is displaying the application. An example environment 910 is shown in FIG. 9B. A user may use the handheld controller 912 to provide input to an information handling system displaying two applications 914 and 916 simultaneously. For example, initially, a user may be using the handheld controller 912 to provide input for a gaming application 914. In some embodiments, display of the application 914 may initially take up an entirety of a display. A user playing the gaming application 914 may receive a pop up message asking the user to perform a task in a second application, such as to make an edit to a design or image. The user may launch a second application 916 and the second application 916 may be displayed side by side with the first application 914. The second application 916 may, for example, be an image or video editing application. Different input modes may be determined for the controller 912 depending on whether input is being received for the first application 914 and the second application 916. Additionally, a different input mode may be determined for the controller 912 when input is being received for selecting which of applications 914 and 916 to provide input to when both applications are displayed simultaneously. In some embodiments, the input modes may also be assigned custom input configurations based on the application for which input is being received. For example, different swipe input modes may include different directions of swipes received on a touchpad of the handheld controller mapped to specific actions in different applications for which input is being received. Thus, when a user opens a second application 916 to be displayed alongside the first application 914 and the controller begins to provide input for the second application 916, a second, different, input mode for the controller may be determined.

In some embodiments, the input mode for the second application may include a plurality of input modes for a touchpad of the controller 912. For example, a first input mode may be assigned to a first portion of a touchpad of the handheld controller 912, such as a top half of the touchpad of the handheld controller, while a second input mode may be assigned to a second portion of the touchpad of the handheld controller 912, such as a bottom half of the touchpad of the handheld controller 912. In some embodiments, an input mode assigned to a top half of the touchpad of the handheld controller may be a touchpad input mode. Thus, when a user touches a top half of the touchpad of the handheld controller 912, coordinate input indicating movement of a finger across the top half of the touchpad may be received for the application 916 and one or more actions may be performed in the application 916 based on the received input and the input mode. For example, input received using the touchpad input mode of the top half of the touchpad may be used to allow a user to navigate a cursor around an image or design file. In some embodiments, an input mode assigned to a bottom half of the touchpad of the handheld controller 912 may be a swipe input mode. Thus, when a user swipes a finger across a bottom half of the touchpad of the handheld controller 912, an action may be performed in the application 916 that corresponds to a direction of the swipe. For example, specific actions of the application 916 may be mapped to specific swipe directions, or areas at which a swipe ends, of the bottom half of the touchpad of the handheld controller. For example, specific design tools may be activated when input is received from the handheld controller 912 indicating a user swiping in a particular direction or to a particular area.

In some embodiments, a user may manually activate a particular input mode for the handheld controller 912, such as by selecting a particular option on screen in an application, such as application 916, or by pushing a particular button on the handheld controller. For example, the user may navigate to a sharing function using the handheld controller 912 which may activate a wheel select mode of the touchpad of the handheld controller. The user may enter input using the handheld controller 912 that corresponds to a sharing function to a social account to share content generated using the second application 916. A user may then enter an application select mode of the information handling system using the handheld controller 912 to select between providing input to the first application 914 and the second application 916. When the handheld controller 912 is providing input for an application selection mode, a third input mode may be determined for the handheld controller 912, such as a direct input mode. The direct input mode may, for example, be a D-pad input mode and input may be received to select the first application 914, such as pressing of a left portion of the touchpad of the handheld controller 912. When the first application is selected, the input mode corresponding to the first application, such as a direct input mode or a wheel select input mode, may be determined for the handheld controller 912 and input may be received and interpreted according to the determined input mode for the first application 914. In some embodiments, the user may close the second application 916 and the first application 914 may be displayed on an entirety of a display. Thus, different input modes may be determined based on an environment for which input is being received from a handheld controller and based on a user profile of a user using the controller.

A variety of input modes may be determined for a handheld controller based on an environment for which input is being received. The input modes of the handheld controller may operate according to logic executed by an information handling system, such as logic executed to interpret input information received from the handheld controller. One example input mode for a handheld controller is a wheel select input mode. An example finite state machine (FSM) diagram 1000 for a wheel select input mode for a touchpad of the handheld controller is shown in FIG. 10A. At state 3.0 1002, the information handling system receiving input from the handheld controller may determine that the touchpad of the controller is not touched and that the touchpad is in a third mode, corresponding to the wheel select input mode. In state 3.0 802, a selected portion of the touchpad corresponding to an action selected in a select operation may be set to a previously selected action or to a default action. When the information handling system detects that the user touches the touchpad, the FSM 1000 may enter state 3.1 1004. In state 3.1 1004, the information handling system may determine that the touchpad is touched, the touchpad of the handheld controller is in the third mode, that the touchpad has not yet been touched for a period of time, such as five second or more. In some embodiments, the information handling system may determine that an inner section of the touchpad is being touched by the user. In state 3.1 804, the information handling system may determine that an input should not yet be performed because a user has not yet touched the touchpad for a predetermined period of time and a user is still touching the touchpad. When the information handling system detects that the user has removed a finger from the touchpad before touching the touchpad for a period of time, such as 0.5 seconds or more, while the touchpad is still in the third mode, the FSM 1000 may enter state 3.2, 1006. State 3.2 1006 may, for example, be referred to as a tap state. In state 3.2 1006, the information handling system may determine that the touchpad is not touched, that the touchpad is in the third mode, and that the touchpad was not touched for a period of time, such as 0.5 seconds or more, before the user's finger was removed. In state 3.2 1006, if an active section of the touchpad, represented by X, is determined to be a section other than an inner section, and thus corresponds to an action of an application for which input is being received, the information handling system may cause the application to perform the action that corresponds to the selected section of the touchpad. In state 3.2 1006, if an active section of the touchpad is determined to be the inner section or a default section of the touchpad, the information handling system may refrain from causing an action to be performed in the application. Thus, states 3.0, 3.1, and 3.2 may correspond to a tap action, for performing an action corresponding to an activated section or wedge of an outer portion of the controller, if a section of the outer portion of the controller is activated.

If, after state 3.1 1004 is reached, the information handling system determines that a finger of a user has touched the touchpad of the handheld controller for a period of time, such as 0.5 seconds or more, the information handling system or the handheld controller may play a tone and the FSM 1000 may enter state 4.0 1008. States 1008 and 1010 may correspond to a fourth mode, such as an select mode for the wheel select input mode. In state 4.0 1008, the information handling system may determine that the handheld controller is in a fourth mode, that an input is to be received, and that the touchpad is being touched. The handheld controller may determine a selected section or wedge of the outer portion of the touchpad corresponding to an action. In some embodiments, the information handling system may monitor a position of a user's finger on the touchpad to determine a selected section of the outer portion of the touchpad until a user removes the finger from the touchpad and/or until the user selects a segment of the outer portion of the touchpad different from a currently selected section of the outer portion of the touchpad. The information handling system may then update the selected section of the outer portion of the touchpad, such as by mapping an action corresponding to the selected section of the touchpad to tapping of the touchpad as described with respect to states 1002, 1004, and 1006. Thus, states 1002, 1004, 1008, and 1010 may correspond to an action select input. When a user moves a finger to an outer portion of the touchpad that corresponds to an action while in state 4.0 1008, the information handling system or handheld controller may play a tone corresponding to selection of an action. When a user releases a finger having selected a section of the outer portion of the touchpad corresponding to an action in an application for which input is being received, the information handling system may determine that the FSM has entered state 4.1 1010. In state 4.1 1010, the information handling system may determine that the handheld controller is in a fourth mode, that input is not currently being received, and that the touchpad is no longer being touched. In state 4.1 1010, the information handling system may assign the action corresponding to the area selected at state 4.0 1008 to be performed upon tapping of the touchpad. The information handling system may then proceed to state 1002 of the FSM 1000 to wait for receipt of a tap or action assignment input.

An example finite state machine (FSM) diagram 1020 for a swipe input mode for a touchpad of the handheld controller is shown in FIG. 10B. At state 2.0 1022, the information handling system receiving input from the handheld controller may determine that the touchpad of the controller is not touched, that the touchpad is in a second mode, corresponding to the swipe input mode, and that a finger of the user is not currently in contact with the touchpad and thus a section of the touchpad is not yet selected. When the touchpad is touched, the FSM 1020 may enter state 2.1 1024. In state 2.1 1024, the information handling system may determine that a finger is in contact with the touchpad and that the touchpad is in the second mode. The information handling system may monitor the touchpad to determine when an action has been selected by a user. For example, a plurality of actions to be performed in an application for which input is being received may be mapped to a plurality of outer sections of the touchpad of the handheld controller or a plurality of swipe directions on the touchpad of the handheld controller. When the handheld controller receives a swipe input in a direction or to a segment of an outer portion of the touchpad corresponding to an action, the information handling system or handheld controller may play a tone. In some embodiments, the information handling system may, in state 2.1 1024, monitor input from a finger of a user until the finger is removed. Thus, a user may adjust a selected action prior to removing a finger from the touchpad and the information handling system may perform only the action selected most recently prior to removal of the finger from the touchpad. When the information handling system detects that a user's finger has been removed from the touchpad of the handheld controller, the FSM 1020 may enter state 2.2 1026. At state 2.2 1026, the information handling system may determine that a finger is no longer in contact with the touchpad, that the handheld controller is in the second input mode, and that an area or swipe direction of the touchpad corresponding to an action to be performed in the application for which input is being received is selected. The information handling system may instruct the application to perform the selected action. The FSM 1020 may then proceed to state 2.0 1022 to await further input from a user.

An example finite state machine (FSM) diagram 1040 for a direct input mode for a touchpad of the handheld controller is shown in FIG. 10C. At state 1.0 1042, the information handling system receiving input from the handheld controller may determine that the touchpad of the controller is not touched, that the touchpad is in a first mode, corresponding to the direct input mode, and that a finger of the user is not currently in contact with the touchpad and thus a section of the touchpad is not yet selected. When the touchpad is touched, the FSM 1020 may enter state 1.1 1044 and may play a tone. In state 1.1 1044, the information handling system may determine a portion of the touchpad that is touched or pushed and may determine an action corresponding to the portion of the touchpad that is touched or pushed. If the information handling system does not detect a portion of the touchpad that is touched or pushed, the information handling system may remain in state 1.1 while the touchpad is touched or pushed until the portion of the touchpad that is touched or pushed is detected. When the information handling system determines the portion of the touchpad that is touched or pushed, the information handling system may instruct the application for which input is being received to perform the action corresponding to the determined portion. Then, when the user's finger is removed, the FSM 1040 may proceed to state 1.0 1042 to await further input by the user.

An example finite state machine (FSM) diagram 1060 for a touchpad input mode for a touchpad of the handheld controller is shown in FIG. 10D. At state 0.0 1062, the information handling system receiving input from the handheld controller may determine that the touchpad of the controller is not touched, that the touchpad is in a fifth mode, corresponding to the touchpad input mode, and that a finger of the user is not currently in contact with the touchpad and thus a section of the touchpad is not yet selected. When the touchpad is touched, the FSM 1064 may enter state 0.1 1064. In state 0.1 1064, the information handling system may determine that the handheld controller is in the fifth input mode and that the touchpad is touched. The handheld controller may further determine an area of the touchpad that is currently touched by a user, such as XY coordinates of an area of the touchpad currently touched by the user. In the state 1064, the information handling system may receive a stream of coordinates of portions of the touchpad touched by the user over time, such as at set timing intervals, as a user moves a finger across the touchpad. The information handling system may instruct an application for which input is being received to perform one or more actions corresponding to the received coordinates, such as to control a cursor or other pointer based on changes in the received coordinates. When a user ceases to touch or press the touchpad, the FSM 1060 may return to state 1062 to await further input from the user.

An example timing diagram 1080 for a wheel select input mode is shown in FIG. 10E. An example tap operation 1082 may begin when the information handling system determines that a user has pressed a touchpad of the handheld controller and may end when the user ceases to press the touchpad before a period of time, such as 0.5 seconds, has elapsed, such as at event 1088. The tap operation 1082 may correspond to state 3.1 1004 of FIG. 10A, and the removal of the finger from the touchpad at event 1088 may correspond to state 3.2 1006 of FIG. 10A. If no action is selected or assigned for the wheel select mode, the handheld controller may not perform an action. An example select operation 1086 may begin when the information handling system determines that a user has pressed the touchpad of the handheld controller for less than a period of time, such as 0.5 seconds. Such a state may correspond to state 3.1 1004 of FIG. 10A. Once a user has pressed the touchpad for a period of time, such as 0.5 seconds, or more, the information handling system may begin to monitor a location of the finger on the touchpad and may continue to monitor a location of the finger on the touchpad throughout monitoring action 1092. The select operation 1086 may, for example, correspond to states 3.1 1004 and 4.0 1008 of FIG. 10A. Monitoring action 1092 may, for example, correspond to state 4.0 1008 of FIG. 10A. When a user removes a finger from the touchpad at removal event 1094, the information handling system may determine the selected action and may assign the action to the touchpad, such as by activating the action to be performed when a tap action is performed on the touchpad. Removal event 1094 may, for example, correspond to state 1010 of FIG. 10A. A subsequent tap operation 1084 may begin when the information handling system determines that the user has placed a finger on or pressed the touchpad of the handheld controller subsequent to selection of the action in select operation 1086 and may end at event 1090 when the user removes the finger from or ceases to press the touchpad. The information handling system may then perform the action assigned by the select operation 886. Thus, in a wheel select input mode a select operation may be performed to select an action for mapping or assignment to the touchpad, and the action may be performed when a subsequent tap operation is performed.

An example method 1100 for display of graphical overlays corresponding to an input mode of a handheld controller is shown in FIG. 11. The method 1100 may begin at block 1102 with determining a first input mode for a handheld controller. For example, an information handling system, such as a host information handling system, executing an application for which input is being received may determine a first input mode for the handheld controller. Alternatively or additionally, an information handling system, such as a client information handling system, executing a service to display audio and video for an application executed by a different information handling system, such as a host information handling system, may determine the input mode of the handheld controller. The input mode of the handheld controller may, for example, include an input mode for a touchpad of a handheld controller, such as a touchpad input mode, a swipe input mode, a wheel select input mode, or a direct input mode, as discussed herein.

In some embodiments, determining the input mode of the handheld controller at block 1102 may include determining a first input mode for a first portion of a touchpad of the handheld controller and determining a second input mode for a second portion of the touchpad of the handheld controller. For example, different input modes may be mapped to different portions of the touchpad of the handheld controller, such as to a top half of the touchpad and to a bottom half of the touchpad. As one particular example, a touchpad input mode may be mapped to a bottom half of the touchpad of the handheld controller while a swipe input mode may be mapped to the top half of the touchpad of the handheld controller.

In some embodiments, determining the input mode of the handheld controller at block 1102 may be performed based on a user profile for a user of the handheld controller and an environment for which input is currently being received from the handheld controller. For example, the information handling system, such as the host or client information handling system, may determine a user profile for a user of the handheld controller. In some embodiments, the information handling system may receive user authentication information, such as biometric authentication information or a password, from the handheld controller identifying the user. The information handling system may then determine a user profile for a user, such as by providing the authentication information to the a cloud-based information handling system and receiving a user profile corresponding to the authentication information from the cloud-based server, by receiving the user profile from the handheld controller, or by loading the user profile corresponding to the authentication information from a memory of the information handling system. The user profile may, for example, include a plurality of input modes for the handheld controller, such as a plurality of input modes for a touchpad of the handheld controller. The input modes may be mapped to particular environments, such as to particular applications, services, or system processes, for which input is being received from the handheld controller. In some embodiments, the input modes may further include mappings of inputs of the controller to particular actions of particular applications. For example, a user profile may associate a particular application with a swipe input mode of the handheld controller. Furthermore, particular actions of the application may be mapped to particular directional swipes, or to swipes to particular portions of an outer portion of the touchpad of the handheld controller. In some embodiments, a user profile may include multiple input modes of a particular type, such as multiple swipe input modes, for a same environment, such as for a same application. For example, a first input mode may include a first set of actions for an application mapped to a first set of inputs of the handheld controller, while a second input mode may include a second set of actions for an application mapped to a second set of inputs of the handheld controller. Thus, the user profile may include mappings of different inputs to particular actions of an application for which input is being received. The information handling system may also determine an environment for which input is currently being received from the handheld controller, such as an application, service, or system process for which input is currently being received. The information handling system may then determine the first input mode for the touchpad of the handheld controller based, at least in part, on the user profile and the environment. For example, the information handling system may determine an input mode that corresponds to a determined application for which input is being received based on the user profile.

At block 1104, the information handling system may determine a graphical overlay corresponding to the first input mode of the handheld controller. The graphical overlay may include a graphical representation of the touchpad. Determining a graphical overlay may include generating a graphical overlay based on the determined input mode or loading a graphical overlay corresponding to the first input mode, such as loading a graphical overlay corresponding to the first input mode from a user profile of the user. For example, a host information handling system executing an application for which input is being received may determine a graphical overlay corresponding to the determined input mode for the handheld controller associated with the application being executed based on a user profile of the user using the handheld controller. The graphical overlay may, for example, include indications of one or more inputs of the touchpad associated with one or more actions associated with the environment. For example, if the determined input mode includes a wheel select input mode, the graphical overlay may include a graphical representation of the touchpad, indications of actions mapped to portions or wedges of an outer portion of the touchpad, and an indication of a currently selected action mapped to the touchpad at a center of the graphical representation of the touchpad. As another example, if the input mode includes a touchpad input mode, the graphical overlay may include a graphical representation of the touchpad and an indication of a portion of the touchpad, if any, currently being touched by the user. As another example, if the input mode includes a swipe input mode, the graphical overlay may include indications of a plurality of actions associated with a plurality of respective swipe directions, or areas of an outer portion of the touchpad that may be swiped to from an inner portion of the touchpad to activate one or more actions. As another example, if the input mode includes a direct input mode, the graphical overlay may include a graphical representation of the touchpad including indications of one or more actions mapped to pressing of particular areas of the touchpad.

At block 1106, the information handling system may display the graphical overlay. For example, the graphical overlay may be overlaid on a display of an application for which input is being received from the handheld controller. In some embodiments, the information handling system executing an application for which input is being received, such as a host information handling system, may display the graphical overlay by overlaying the graphical overlay on a display of the host information handling system. In some embodiments, a host information handling system executing the application for which input is being received may display the graphical overlay by transmitting the graphical overlay, along with visual and audio information for the application, to a client information handling system executing a service to display visual and audio data for the application received from the host information handling system. In some embodiments, a client information handling system may display the graphical overlay by receiving the graphical overlay from a host information handling system along with visual and audio information for an application for which input is being received that is executed by the host information handling system and overlaying the graphical overlay on a display of the visual information received from the host information handling system.

At block 1108, the information handling system may receive input from the handheld controller. In some embodiments, input may be received directly from the handheld controller by a host information executing an application for which input is being received or by a client information handling system executing a service for presenting audio and visual information for the application for which input is being received. In some embodiments, input may be received indirectly from a host or client information handling system. For example, input information may be received by a client information handling system displaying the application from a host information handling system executing the application or by a host information handling system executing the application from a client information handling system displaying the application. In some embodiments, the input received from the handheld controller may include an instruction to adjust an input mode of the handheld controller. For example, the input received from the handheld controller may include an instruction to change from a first input mode to a second input mode. Change from a first input mode to a second input mode may include changing of one or more mappings of one or more actions to one or more inputs of a touchpad of the handheld controller or changing from one type of input mode, such as a swipe input mode, to another type of input mode, such as a touchpad input mode, for a touchpad of the handheld controller. In some embodiments, input received from a handheld controller may include coordinates for one or more portions of the touchpad of the handheld controller touched or pressed by a user, indications of movements of a finger across the touchpad of the handheld controller, timing information for touching or pressing of the handheld controller, and other input information. For example, in some embodiments the handheld controller may transmit and the information handling system may receive coordinate and timing information for one or more portions of the touchpad touched by a user of the handheld controller. In some embodiments, the handheld controller may transmit and the information handling system may receive indications of specific segments of the handheld controller touched or pressed by a user, such as indications of specific segments mapped to specific actions of an application for which input is being received.

In some embodiments, the input information received at block 1108 may be input information corresponding to one or more actions to be performed by the application. For example, a user may use the handheld controller to provide a selection of an action to be performed in an application, and the information handling system may instruct the application to perform the selected action. At block 1110, the information handling system may instruct the handheld controller to generate haptic feedback based on the received input information. For example, the user profile may include one or more haptic feedback patterns associated with one or more inputs of one or more input modes of the handheld controller, and the information handling system executing the application may instruct the handheld controller to generate haptic feedback corresponding to the received input information. In some embodiments, a client information handling system, as discussed herein, may instruct the handheld controller to generate the haptic feedback.

At block 1112, the information handling system, such as a client or host information handling system, may update the graphical overlay based on the received input information. Updating the graphical overlay may include displaying an updated graphical overlay. For example, if received input information corresponds to an action to be performed in an application for which input is being received from the handheld controller, the information handling system may update the graphical overlay to include an indication of the received input. As one particular example, if the input mode is a wheel select mode and the input information indicates selection of an action to be mapped to the touchpad for activation at future taps of the touchpad, the graphical overlay may be updated to indicate the action that will be performed when the touchpad is pressed or touched for less than a period of time, such as 0.5 seconds. For example, an icon representing the selected action may be overlaid on an inner portion of a graphical representation of the touchpad. In some embodiments, the input information may include an instruction to change from a first input mode of the handheld controller to a second input mode of the handheld controller. For example, the input may include an instruction to change from a wheel select mode to a direct mode for the touchpad of the handheld controller. In such embodiments, updating the graphical overlay may include ceasing display of a first graphical overlay corresponding to the wheel select mode and beginning display of a second graphical overlay corresponding to the direct mode. As another example, the input information may include an instruction to map a different action to a different input of a touchpad of the handheld controller. For example, the input may include an instruction to map a new action to selection of an upper portion of the touchpad of the handheld controller. When a new action is mapped to an input, updating the graphical overlay may include removing an indication of an action that was previously mapped to the input and including an indication of the new action mapped to the input in the updated graphical overlay. Thus, a graphical overlay may be updated to reflect inputs entered by a user or to reflect a new input mode activated for the handheld controller.

As one particular example of the method 1100, a client information handling system running an application to receive and present audio and visual data from a host information handling system executing an application for which input is being received from the handheld controller may, at block 1102, receive authentication information from the handheld controller. The client information handling system may request a user profile from a cloud-based service and may determine an input mode based on an environment for which input is being received, such as an application for which input is being received, and the user profile. The cloud-based service may also notify the host information handling system of the determined input mode for the handheld controller. The environment for which input is being received may be a gaming workspace with two active applications displayed, a gaming application and a social application, allowing a user to select between the two applications. The client information handling system may, for example, determine at block 1102 that, according to the user profile of the user, the input mode for the handheld controller should be a direct input mode, allowing a user to press a left or right portion of the touchpad of the handheld controller to select between the two applications for provision of input. At block 1108, the client information handling system may receive input from a user indicating selection of the gaming application, such as input information from the handheld controller indicating a left portion of the touchpad was pressed by the user. The method may then proceed to block 1102 where an input mode may be determined, such as based on the user profile and the selected gaming application. For example, the gaming application may be assigned a wheel select input mode, and the client information handling system may determine that the input mode for the handheld controller is the wheel select input mode. In some embodiments, the client information handling system may, at block 1108, receive input information from the handheld controller using the wheel select input mode and may update the graphical overlay at block 1112 to include visual feedback indicating input that is received from the handheld controller. Likewise, at block 1110, the client information handling system may transmit instructions to the handheld controller to generate haptic feedback based on the input information, such as haptic feedback associated with an area of the touchpad that the user is touching or recently touched. In some embodiments, the client information handling system may, at block 1108, receive input indicating a change in an input mode. For example, a user may use the handheld controller to open a configuration panel to configure an input mode for the handheld controller. The client information handling system may further receive, at block 1108, instructions assigning one or more actions for the gaming application to specific inputs of the touchpad, such as to specific swipe directions or areas of the touchpad. The client information handling system may then, at block 1108, receive input indicating a switch to the newly configured swipe input mode of the handheld controller. The client information handling system may then, at block 1108, receive swipe input from the handheld controller for performing one or more actions in the gaming application. In some embodiments, the steps described above may be performed by a host information handling system.

One particular input mode for a touchpad of a handheld controller is a wheel select input mode. In some embodiments of the wheel select input mode, an information handling system may receive a select input from the handheld controller selecting an action mapped to an area of an outer portion of a touchpad of the handheld controller. Subsequent tap inputs received from the handheld controller, such as inputs indicating that the user pressed the touchpad for less than a period of time, such as 0.5 seconds, may instruct the information handling system to instruct the application for which input is being received to perform the selected action. An example method 1200 for receiving input in a wheel select mode is shown in FIG. 12. The method 1200 may begin at block 1202 with determining that the first input mode for the handheld controller is a wheel select input mode. Such a step may be performed as described with respect to the determination of a first input mode of the handheld controller at block 1102 of FIG. 11.

At block 1204, the information handling system may receive first input information indicating pressing of an inner portion of the touchpad of the handheld controller. For example, the information handling system may receive input from the handheld controller indicating that the user pressed or touched an inner portion of the touchpad for at least a predetermined period of time, such as 0.5 seconds or more. In some embodiments, the first input information may include coordinate information for pressing or touching of the touchpad indicating coordinates of a portion of the touchpad that was pressed or touched corresponding to the inner portion of the touchpad.

At block 1206, the information handling system may receive second input information indicating swiping from the inner portion of the touchpad to a first area of an outer portion of the touchpad after pressing of the inner portion of the touchpad. For example, the second input information received from the handheld controller may indicate that a user, after pressing or touching of the inner portion of the touchpad for at least a period of time, such as 0.5 seconds, moved the user's finger to a first area of an outer portion of the touchpad, without removing the finger. Such information may, for example, be received from a handheld controller and may include coordinate and timing information for positioning of the finger as it was moved from the inner portion to the first area of the outer portion. In some embodiments, the second input information may indicate an area of the outer portion of the touchpad to which the user's finger was moved, such as by a reference number of the area of the outer portion of the touchpad.

At block 1208, the information handling system may map the action corresponding to the first area of the outer portion of the touchpad to the touchpad. For example, the information handling system may map the selected action to pressing of the touchpad, or pressing of the inner portion of the touchpad, for less than a predetermined period of time, such as for less than 0.5 seconds. Pressing or touching of the touchpad for less than a period of time, such as 0.5 seconds, may be referred to as a tap input.

At block 1210, the information handling system may receive third input information from the handheld controller indicating pressing or touching of the touchpad. The third input information may, for example, indicate pressing of the touchpad for less than 0.5 seconds. For example, the third input information may indicate a tap input of the touchpad. The third input information may, for example, indicate that the touchpad was pressed by a user's finger and that the user's finger was removed from the touchpad less than 0.5 seconds after pressing the touchpad. At block 1212, the information handling system may perform the action based on receipt of the third input information. For example, the selected action that was mapped to the touchpad at block 1208 may be performed based upon receipt of the third input information. In some embodiments, the information handling system may repeat blocks 1010 and 1012 when a tap input is received and may repeat blocks 1004-1008 when a select input is received. Thus, an information handling system may receive input from a handheld controller when the touchpad of the handheld controller is determined to be in a wheel select mode.

FIG. 13 illustrates an example information handling system 1300. Information handling system 1300 may include a processor 1302 (e.g., a central processing unit (CPU)), a memory (e.g., a dynamic random-access memory (DRAM)) 1304, and a chipset 1306. In some embodiments, one or more of the processor 1302, the memory 1304, and the chipset 1306 may be included on a motherboard (also referred to as a mainboard), which is a printed circuit board (PCB) with embedded conductors organized as transmission lines between the processor 1302, the memory 1304, the chipset 1306, and/or other components of the information handling system. The components may be coupled to the motherboard through packaging connections such as a pin grid array (PGA), ball grid array (BGA), land grid array (LGA), surface-mount technology, and/or through-hole technology. In some embodiments, one or more of the processor 1302, the memory 1304, the chipset 1306, and/or other components may be organized as a System on Chip (SoC).

The processor 1302 may execute program code by accessing instructions loaded into memory 1304 from a storage device, executing the instructions to operate on data also loaded into memory 1304 from a storage device, and generate output data that is stored back into memory 1304 or sent to another component. The processor 1302 may include processing cores capable of implementing any of a variety of instruction set architectures (ISAs), such as the x86, POWERPC®, ARM®, SPARC®, or MIPS® ISAs, or any other suitable ISA. In multi-processor systems, each of the processors 1302 may commonly, but not necessarily, implement the same ISA. In some embodiments, multiple processors may each have different configurations such as when multiple processors are present in a big-little hybrid configuration with some high-performance processing cores and some high-efficiency processing cores. The chipset 1306 may facilitate the transfer of data between the processor 1302, the memory 1304, and other components. In some embodiments, chipset 1306 may include two or more integrated circuits (ICs), such as a northbridge controller coupled to the processor 1302, the memory 1304, and a southbridge controller, with the southbridge controller coupled to the other components such as USB 1310, SATA 1320, and PCIe buses 1308. The chipset 1306 may couple to other components through one or more PCIe buses 1308.

Some components may be coupled to one bus line of the PCIe buses 1308, whereas some components may be coupled to more than one bus line of the PCIe buses 1308. One example component is a universal serial bus (USB) controller 1310, which interfaces the chipset 1306 to a USB bus 1312. A USB bus 1312 may couple input/output components such as a keyboard 1314 and a mouse 1316, but also other components such as USB flash drives, or another information handling system. Another example component is a SATA bus controller 1320, which couples the chipset 1306 to a SATA bus 1322. The SATA bus 1322 may facilitate efficient transfer of data between the chipset 1306 and components coupled to the chipset 1306 and a storage device 1324 (e.g., a hard disk drive (HDD) or solid-state disk drive (SDD)) and/or a compact disc read-only memory (CD-ROM) 1326. The PCIe bus 1308 may also couple the chipset 1306 directly to a storage device 1328 (e.g., a solid-state disk drive (SDD)). A further example of an example component is a graphics device 1330 (e.g., a graphics processing unit (GPU)) for generating output to a display device 1332, a network interface controller (NIC) 1340, and/or a wireless interface 1350 (e.g., a wireless local area network (WLAN) or wireless wide area network (WWAN) device) such as a Wi-Fi® network interface, a Bluetooth® network interface, a GSM® network interface, a 3G network interface, a 4G LTE® network interface, and/or a 5G NR network interface (including sub-6 GHz and/or mmWave interfaces).

The chipset 1306 may also be coupled to a serial peripheral interface (SPI) and/or Inter-Integrated Circuit (I2C) bus 1360, which couples the chipset 1306 to system management components. For example, a non-volatile random-access memory (NVRAM) 1370 for storing firmware 1372 may be coupled to the bus 1360. As another example, a controller, such as a baseboard management controller (BMC) 1380, may be coupled to the chipset 1306 through the bus 1360. BMC 1380 may be referred to as a service processor or embedded controller (EC). Capabilities and functions provided by BMC 1380 may vary considerably based on the type of information handling system. For example, the term baseboard management system may be used to describe an embedded processor included at a server, while an embedded controller may be found in a consumer-level device. As disclosed herein, BMC 1380 represents a processing device different from processor 1302, which provides various management functions for information handling system 1300. For example, an embedded controller may be responsible for power management, cooling management, and the like. An embedded controller included at a data storage system may be referred to as a storage enclosure processor or a chassis processor.

System 1300 may include additional processors that are configured to provide localized or specific control functions, such as a battery management controller. Bus 1360 can include one or more busses, including a Serial Peripheral Interface (SPI) bus, an Inter-Integrated Circuit (I2C) bus, a system management bus (SMBUS), a power management bus (PMBUS), or the like. BMC 1380 may be configured to provide out-of-band access to devices at information handling system 1300. Out-of-band access in the context of the bus 1360 may refer to operations performed prior to execution of firmware 1372 by processor 1302 to initialize operation of system 1300.

Firmware 1372 may include instructions executable by processor 102 to initialize and test the hardware components of system 1300. For example, the instructions may cause the processor 1302 to execute a power-on self-test (POST). The instructions may further cause the processor 1302 to load a boot loader or an operating system (OS) from a mass storage device. Firmware 1372 additionally may provide an abstraction layer for the hardware, such as a consistent way for application programs and operating systems to interact with the keyboard, display, and other input/output devices. When power is first applied to information handling system 1300, the system may begin a sequence of initialization procedures, such as a boot procedure or a secure boot procedure. During the initialization sequence, also referred to as a boot sequence, components of system 1300 may be configured and enabled for operation and device drivers may be installed. Device drivers may provide an interface through which other components of the system 1300 can communicate with a corresponding device. The firmware 1372 may include a basic input-output system (BIOS) and/or include a unified extensible firmware interface (UEFI). Firmware 1372 may also include one or more firmware modules of the information handling system. Additionally, configuration settings for the firmware 1372 and firmware of the information handling system 1300 may be stored in the NVRAM 1370. NVRAM 1370 may, for example, be a non-volatile firmware memory of the information handling system 1300 and may store a firmware memory map namespace 1300 of the information handling system. NVRAM 1370 may further store one or more container-specific firmware memory map namespaces for one or more containers concurrently executed by the information handling system.

Information handling system 1300 may include additional components and additional busses, not shown for clarity. For example, system 1300 may include multiple processor cores (either within processor 1302 or separately coupled to the chipset 1306 or through the PCIe buses 1308), audio devices (such as may be coupled to the chipset 1306 through one of the PCIe busses 1308), or the like. While a particular arrangement of bus technologies and interconnections is illustrated for the purpose of example, one of skill will appreciate that the techniques disclosed herein are applicable to other system architectures. System 1300 may include multiple processors and/or redundant bus controllers. In some embodiments, one or more components may be integrated together in an integrated circuit (IC), which is circuitry built on a common substrate. For example, portions of chipset 1306 can be integrated within processor 1302. Additional components of information handling system 1300 may include one or more storage devices that may store machine-executable code, one or more communications ports for communicating with external devices, and various input and output (I/O) devices, such as a keyboard, a mouse, and a video display.

In some embodiments, processor 1302 may include multiple processors, such as multiple processing cores for parallel processing by the information handling system 1300. For example, the information handling system 1300 may include a server comprising multiple processors for parallel processing. In some embodiments, the information handling system 1300 may support virtual machine (VM) operation, with multiple virtualized instances of one or more operating systems executed in parallel by the information handling system 1300. For example, resources, such as processors or processing cores of the information handling system may be assigned to multiple containerized instances of one or more operating systems of the information handling system 1300 executed in parallel. A container may, for example, be a virtual machine executed by the information handling system 1300 for execution of an instance of an operating system by the information handling system 1300. Thus, for example, multiple users may remotely connect to the information handling system 1300, such as in a cloud computing configuration, to utilize resources of the information handling system 1300, such as memory, processors, and other hardware, firmware, and software capabilities of the information handling system 1300. Parallel execution of multiple containers by the information handling system 1300 may allow the information handling system 1300 to execute tasks for multiple users in parallel secure virtual environments.

The schematic or flow chart diagrams FIGS. 11-12 are generally set forth as a logical flow chart diagram, and the process flow diagram of FIG. 7 is generally set forth as a logical process flow diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Machine learning models, as described herein, may include logistic regression techniques, linear discriminant analysis, linear regression analysis, artificial neural networks, machine learning classifier algorithms, or classification/regression trees in some embodiments. In various other embodiments, machine learning systems may employ Naive Bayes predictive modeling analysis of several varieties, learning vector quantization artificial neural network algorithms, or implementation of boosting algorithms such as Adaboost or stochastic gradient boosting systems for iteratively updating weighting to train a machine learning classifier to determine a relationship between an influencing attribute, such as received device data, and a system, such as an environment or particular user, and/or a degree to which such an influencing attribute affects the outcome of such a system or determination of environment.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although processors are described throughout the detailed description, aspects of the invention may be applied to the design of or implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
    determining, by an information handling system, a first input mode for a first portion of a touchpad of a handheld controller, wherein determining the first input mode for the touchpad of the handheld controller comprises:
        determining a user profile for a user of the handheld controller;
        determining an environment for which input is currently being received from the handheld controller, wherein determining the environment comprises determining a location of the handheld controller; and
        determining the first input mode for the first portion of the touchpad of the handheld controller based, at least in part, on the user profile and the environment;
    determining, by the information handling system, a second input mode, different from the first input mode, for a second portion of the touchpad of the handheld controller, wherein the first input mode for the first portion of the touchpad of the handheld controller comprises a touchpad input mode, a swipe input mode, a wheel select input mode, or a direct input mode, and wherein the second input mode for the second portion of the touchpad of the handheld controller comprises the touchpad input mode, the swipe input mode, the wheel select input mode, or the direct input mode;
    determining, by the information handling system, a graphical overlay corresponding to the first input mode and the second input mode, wherein the graphical overlay includes a graphical representation of the touchpad; and displaying, by the information handling system, the graphical overlay.

2. The method of claim 1, wherein determining the first input mode for the touchpad of the handheld controller comprises at least one of:

determining that the first input mode for the touchpad of the handheld controller includes the touchpad input mode;

determining that the first input mode for the touchpad of the handheld controller includes the swipe input mode;

determining that the first input mode for the touchpad of the handheld controller includes the wheel select input mode; or determining that the first input mode for the touchpad of the handheld controller includes the direct input mode.

3. The method of claim 1, further comprising:

determining a third input mode, different from the second input mode, for a third portion of the touchpad of the handheld controller.

4. The method of claim 3, wherein the graphical overlay further corresponds to the third input mode.

5. The method of claim 3, wherein the third input mode for the third portion of the touchpad of the handheld controller comprises the touchpad input mode, the swipe input mode, the wheel select input mode, or the direct input mode.

6. The method of claim 1, further comprising:

receiving input information from the handheld controller; and instructing the handheld controller to generate haptic feedback based on the received input information and the first input mode.

7. The method of claim 1, further comprising:

receiving input information from the handheld controller indicating a change from the first input mode to a fourth input mode; and updating the graphical overlay based on the change from the first input mode to the fourth input mode.

8. The method of claim 1, wherein determining the first input mode for the touchpad of the handheld controller comprises determining that the first input mode for the touchpad of the handheld controller includes the wheel select input mode, further comprising:

receiving first input information indicating pressing of an inner portion of the touchpad from the handheld controller;

receiving second input information indicating swiping from the inner portion of the touchpad to a first area of an outer portion of the touchpad after pressing of the inner portion of the touchpad, wherein the first area of the outer portion of the touchpad corresponds to an action to be performed by the information handling system;

mapping the action to the touchpad;

receiving third input information indicating pressing of the touchpad; and performing the action based on receipt of the third input information.

9. The method of claim 1, wherein the first input mode for the first portion of the touchpad of the handheld controller corresponds to a first application of the information handling system, and wherein the second input mode for the second portion of the touchpad of the handheld controller corresponds to a second application of the information handling system different from the first application.

10. An information handling system, comprising:

a memory; and at least one processor coupled to the memory, wherein the at least one processor is configured to:

determine a first input mode for a first portion of a touchpad of a handheld controller, wherein the first input mode for the touchpad of the handheld controller is determined by:

determining a user profile for a user of the handheld controller;

determining an environment for which input is currently being received from the handheld controller, wherein determining the environment comprises determining a location of the handheld controller; and determining the first input mode for the first portion of the touchpad of the handheld controller based, at least in part, on the user profile and the environment;

determine a second input mode, different from the first input mode, for a second portion of the touchpad of the handheld controller, wherein the first input mode for the first portion of the touchpad of the handheld controller comprises a touchpad input mode, a swipe input mode, a wheel select input mode, or a direct input mode, and wherein the second input mode for the second portion of the touchpad of the handheld controller comprises the touchpad input mode, the swipe input mode, the wheel select input mode, or the direct input mode;

determine a graphical overlay corresponding to the first input mode and the second input mode, wherein the graphical overlay includes a graphical representation of the touchpad; and display the graphical overlay.

11. The information handling of claim 10, wherein the at least one processor is further configured to determine the first input mode for the touchpad of the handheld controller by at least one of:

determining that the first input mode for the touchpad of the handheld controller includes the touchpad input mode;

determining that the first input mode for the touchpad of the handheld controller includes the swipe input mode;

determining that the first input mode for the touchpad of the handheld controller includes the wheel select input mode; or determining that the first input mode for the touchpad of the handheld controller includes the direct input mode.

12. The information handling system of claim 10, wherein the at least one processor is further configured for:

determining a third input mode, different from the second input mode, for a third portion of the touchpad of the handheld controller.

13. The information handling system of claim 12, wherein the graphical overlay further corresponds to the third input mode.

14. The information handling system of claim 10, wherein the at least one processor is further configured to:

receive input information from the handheld controller; and instruct the handheld controller to generate haptic feedback based on the received input information and the first input mode.

15. The information handling system of claim 10, wherein the at least one processor is further configured to:

receive input information from the handheld controller indicating a change from the first input mode to a fourth input mode; and update the graphical overlay based on the change from the first input mode to the fourth input mode.

16. The information handling system of claim 10, wherein the at least one processor is further configured to determine the first input mode for the touchpad of the handheld controller by determining that the first input mode for the touchpad of the handheld controller includes the wheel select input mode, and wherein the at least one processor is further configured to:

receive first input information indicating pressing of an inner portion of the touchpad from the handheld controller;

receive second input information indicating swiping from the inner portion of the touchpad to a first area of an outer portion of the touchpad after pressing of the inner portion of the touchpad, wherein the first area of the outer portion of the touchpad corresponds to an action to be performed by the information handling system;

map the action to the touchpad;

receive third input information indicating pressing of the touchpad; and perform the action based on receipt of the third input information.

17. A computer program product, comprising:

a non-transitory computer readable medium comprising instructions for causing an information handling system to perform steps comprising:

determining a first input mode for a first portion of a touchpad of a handheld controller, wherein determining the first input mode for the touchpad of the handheld controller comprises:

determining a user profile for a user of the handheld controller;

determining an environment for which input is currently being received from the handheld controller, wherein determining the environment comprises determining a location of the handheld controller; and determining the first input mode for the first portion of the touchpad of the handheld controller based, at least in part, on the user profile and the environment;

determining a second input mode, different from the first input mode, for a second portion of the touchpad of the handheld controller, wherein the first input mode for the first portion of the touchpad of the handheld controller comprises a touchpad input mode, a swipe input mode, a wheel select input mode, or a direct input mode, and wherein the second input mode for the second portion of the touchpad of the handheld controller comprises the touchpad input mode, the swipe input mode, the wheel select input mode, or the direct input mode;

determining a graphical overlay corresponding to the first input mode and the second input mode, wherein the graphical overlay includes a graphical representation of the touchpad; and displaying the graphical overlay.

18. The computer program product of claim 17, wherein determining the first input mode for the touchpad of the handheld controller comprises at least one of:

determining that the first input mode for the touchpad of the handheld controller includes the touchpad input mode;

determining that the first input mode for the touchpad of the handheld controller includes the swipe input mode;

determining that the first input mode for the touchpad of the handheld controller includes the wheel select input mode; or determining that the first input mode for the touchpad of the handheld controller includes the direct input mode.

19. The computer program product of claim 17, wherein the non-transitory computer readable medium comprises further instructions for:

determining a third input mode, different from the second input mode, for a third portion of the touchpad of the handheld controller.

* * * * *